US007209892B1

(12) United States Patent
Galuten et al.

(10) Patent No.: US 7,209,892 B1
(45) Date of Patent: Apr. 24, 2007

(54) ELECTRONIC MUSIC/MEDIA DISTRIBUTION SYSTEM

(75) Inventors: Albhy Galuten, Santa Monica, CA (US); Dmitry Radbel, Pacific Palisades, CA (US); Peter Williams, Sydney (AU)

(73) Assignee: Universal Music Group, Inc., Santa Monica, CA (US)

( * ) Notice: Subject to any disclaimer, the term of this patent is extended or adjusted under 35 U.S.C. 154(b) by 0 days.

(21) Appl. No.: 09/471,971

(22) Filed: Dec. 23, 1999

Related U.S. Application Data

(60) Provisional application No. 60/127,260, filed on Mar. 31, 1999, provisional application No. 60/113,861, filed on Dec. 24, 1998.

(51) Int. Cl.
*G06Q 30/00* (2006.01)
(52) U.S. Cl. .......................................... 705/26; 705/27
(58) Field of Classification Search ............. 705/26–27
See application file for complete search history.

(56) References Cited

U.S. PATENT DOCUMENTS

| | | | |
|---|---|---|---|
| 5,629,980 A | 5/1997 | Stefik et al. .................... 380/4 |
| 5,734,719 A | 3/1998 | Tsevdos et al. ................ 380/5 |
| 5,745,879 A | 4/1998 | Wyman ......................... 705/1 |
| 5,793,980 A | 8/1998 | Glaser et al. .......... 395/200.61 |
| 5,809,145 A | 9/1998 | Slik ............................. 380/25 |
| 5,825,876 A | 10/1998 | Peterson ....................... 380/4 |
| 5,889,860 A | 3/1999 | Eller et al. ..................... 380/4 |
| 5,895,454 A | 4/1999 | Harrington .................... 705/26 |
| 5,910,987 A * | 6/1999 | Ginter et al. ................. 705/52 |
| 5,918,213 A | 6/1999 | Bernard et al. ............... 705/26 |
| 5,953,005 A | 9/1999 | Liu ............................. 345/302 |
| 5,959,945 A | 9/1999 | Kleiman ....................... 369/30 |
| 5,963,916 A * | 10/1999 | Kaplan ......................... 705/26 |
| 5,969,283 A | 10/1999 | Looney et al. ................ 84/609 |
| 5,987,525 A | 11/1999 | Roberts et al. ............. 709/248 |

(Continued)

FOREIGN PATENT DOCUMENTS

WO       WO 9737316       * 10/1997

OTHER PUBLICATIONS

"NetWaveInc.comTM Kicks Off QuickBuyTM Enabling Faster, Easier, Safer E-Business," Business Wire, Oct. 7, 1998, 1337, Dialog File 148 10507244.*

(Continued)

*Primary Examiner*—Robert M. Pond
(74) *Attorney, Agent, or Firm*—Darby & Darby

(57) ABSTRACT

An electronic media distribution system which facilitates the distribution of media to consumers over a network, such as the Internet, while achieving commercial business objectives and protecting the intellectual property rights associated with the media being distributed. The system provides the infrastructure and support for various market participants to engage in buying, selling, finding and distributing music. The system provides an interface for consumers to locate, access and receive musical content over the Internet. The system facilitates continued control over the musical content sent to consumers by dynamically enforcing retailer agreements and restrictions governing the purchase, use, and distribution of the content. The system also provides a service to retailers and distributors in assisting with the management of sales and distribution of music over the Internet. Specifically, the system certifies and distributes retail offers for the content where the offers are dynamically updated by electronic contracts between the retailers and distributors of the music.

67 Claims, 14 Drawing Sheets

U.S. PATENT DOCUMENTS

| | | | | |
|---|---|---|---|---|
| 6,009,401 | A | 12/1999 | Horstmann | 705/1 |
| 6,011,761 | A | 1/2000 | Inoue | |
| 6,012,086 | A | 1/2000 | Lowell | |
| 6,083,009 | A | 7/2000 | Kim et al. | 434/307 |
| 6,092,049 | A * | 7/2000 | Chislenko et al. | 705/10 |
| 6,167,567 | A | 12/2000 | Chiles et al. | 717/11 |
| 6,182,125 | B1 | 1/2001 | Borelia et al. | 709/218 |
| 6,185,602 | B1 | 2/2001 | Bayrakeri | 709/204 |
| 6,226,618 | B1 * | 5/2001 | Downs et al. | 705/1 |
| 6,314,409 | B2 | 11/2001 | Schneck et al. | 705/54 |
| 6,385,596 | B1 * | 5/2002 | Wiser et al. | 705/51 |
| 6,785,661 | B1 | 8/2004 | Mandler et al. | |
| 2002/0103824 | A1 | 8/2002 | Koppolu et al. | 707/501.1 |

OTHER PUBLICATIONS

Liquid Audio, "Liquid Audio Music-On-Demand System," Internet Archive Wayback Machine, www.archive.org, Oct. 10, 1997, 23 pages.*

Electronic Commerce News, "Softbank Plans Its Content Metering," Jun. 23, 1997, v2n25, Proquest, ISSN: 10862870.*

Liquid Audio: Internet Archive Wayback Machine, www.archive.org; liquidaudio.com; Oct. 10, 1997, 27 pgs.*

Smith, Mary Grace; "A new set of rules for information commerce- -Rights-protection technologies and personalized-information commerce will affect all knowledge workers," CommunicationsWeek, Nov. 6, 1995, p. 34, Proquest #10792731, 7pgs.*

Business Wire; "InterTrust announces a commerce system for digital information providers and payment processing companies," Jun. 22, 1998, Proquest # 30358370, 7pgs.*

Supplemental European Search Report, European Patent Application No. 999676000.0, dated Jul. 8, 2005.

van Halteren, Aart T. et al., "Value Added Web: Integrating WWW with a TINA Service Management platform", pp. 14-23 (1999).

Tothezan, Ionel, et al., "Enterprise Modelling of Information Brokerage and Retailer Services", Architecture for Information Brokerage Services, CEC projeact AC206, pp. 13-22 (1997).

PCT International Search Report, International Application No. PCT/US00/02043, dated May 10, 2000.

* cited by examiner

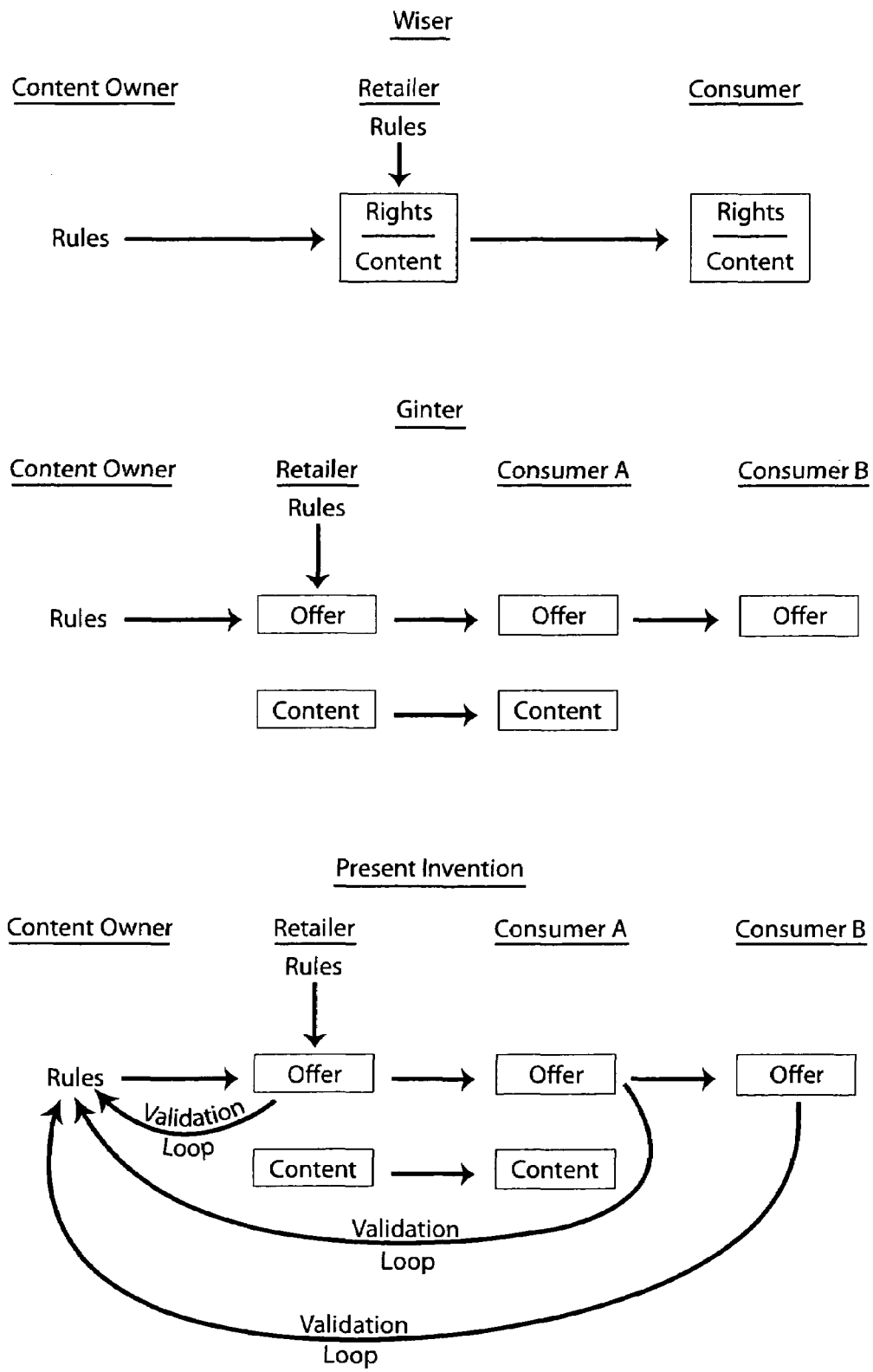

ELECTRONIC MUSIC/MEDIA DISTRIBUTION SYSTEM

This application claims priority pursuant to 35 U.S.C. §119 from Provisional Patent Application Ser. No. 60/113,861 filed Dec. 24, 1998 and Provisional Patent Application Ser. No. 60/127,260 filed Mar. 31, 1999, the entire disclosures by which are hereby incorporated by reference.

BACKGROUND OF THE INVENTION

In the music industry, music has been sold to consumers by music retailers for years on various media. Today, music marketed to consumers is typically recorded on cassette tapes and compact discs (CD) and sold at retail stores. With the advent of the Internet, various consumer products, including recorded music, are marketed and sold over the Internet, where the financial transaction is handled electronically but the product is physically delivered by some other means such as the postal service or a private carrier. The consumer may purchase a CD from a retailer using a retailer's web site and receive the CD in the mail. Once the consumer receives the CD having purchased it, the consumer can listen to the music repeatedly by playing the CD in a separate device such as a CD player or the consumer can give the CD to someone else. The retailer and copyright owner have lost control over that product in that, for example, the music may be copied but no further payment or royalties are collectable.

Music is also available on the Internet for consumers to listen to without purchasing. As the music is transmitted over the Internet, it is played at the consumer's computer by a software application such as Real-Player but the music is at no time resident at the consumer's computer. The consumer does not own the music, cannot retain the music and cannot replay the music without accessing the source through the Internet. The source, presumably the music retailer, retains control over the music.

A disadvantage of conventional systems is that they fail to afford consumers and retailers flexibility in the methods for receiving and using music and the amount of control transferred from the music owner or retailer to the music purchaser. There is a need for a system that enables consumers to find, purchase and receive music completely over the Internet in a way comparable to conventional purchasing of music at a retail store. What is further needed is a system for delivering music that offers consumers alternatives to purchasing, such as renting music. The present invention satisfies these and other needs.

The development of the present invention has become possible in part due to the creation of suitable technologies upon which it can be built. These elements include a secure persistent container in which the content resides, the ability to have rules that persistently apply to that content coupled with a distributed rights system that can interpret and act upon these rules.

SUMMARY OF THE INVENTION

The present invention is an electronic media distribution system. The system facilitates the distribution of media to consumers over a network, such as the Internet, while achieving commercial business objectives and protecting the intellectual property rights associated with the media being distributed. One such media distributed by the system is musical content. The invention has other applications, with the distribution of music being a preferred application and not limiting of the scope of the present invention.

The present invention provides the infrastructure and support for various market participants to engage in buying, selling, finding and distributing music. Content owners, distributors, retailers and consumers are all market participants. The system provides an interface for consumers to locate, access and receive musical content over the Internet. The system facilitates continued control over the musical content sent to consumers by dynamically enforcing retailer agreements and restrictions governing the purchase, use, and distribution of the content. The system also provides a service to retailers and distributors in assisting with the management of sales and distribution of music over the Internet. Specifically, the system provides a designated module (i.e. instructions executable by a computer processor) for certifying and distributing retail offers for the musical content where the offers are dynamically updated by electronic contracts between the retailers and distributors of the music. To do this the system maintains the content in secure or tamper resistant format independent and separate from offers which are also in secure or tamper resistant format.

The present invention includes systems for performing the following tasks: managing the musical content; providing a system for consumers to find the content and associated commercial offers; delivering the content and enforcing the terms of the offers; and tracking usage and settling financial transactions related to the purchase, use or distribution of the content.

In the preferred embodiment of the present invention, the system architecture includes eight modules, as illustrated in FIG. 1: Production System, Retail Web Site, Consumer Player, Reference Service, Delivery Service, Content Catalog, Registration Manager, and Financial Clearinghouse. Each of the modules performs a specific set of related functions while communicating with other modules through specified standard interfaces. The communication interfaces provide a great deal of flexibility in the implementation details of the individual modules. The modules are defined such that multiple or different implementations of each of the modules can be supported within the standard interfaces.

The Production System 110 maintains mass data content, e.g., music, lyrics and photos, and associated commercial offers and sends the data to the Delivery Service for storage. The Production System also assists retailers in maintaining their web sites and producing offers. The Retail Web Sites 112 are web sites of music retailers who subscribe to the distribution service and provide an environment for consumers to access and purchase music over the Internet. The Consumer Player 114 enables consumers to interact with the system to directly download and purchase music from the Retail Web Site and play and store the music locally while enforcing the business rules governing the purchase arrangement. The Reference Service 116 validates and certifies the retailer's offers and provides the mechanism for consumers to purchase the content by binding it with valid commercial offers. The Delivery Service 118 downloads the actual content and associated rights from its database to the Consumer Player. The Content Catalog 120 is a database optimized for quickly finding the content based on a constrained set of attributes and can be accessed via a query function implemented at the Retail Web Sites. The Registration Manager 122 downloads the Consumer Player for the consumer the first time the consumer uses the system and maintains the system's security on an ongoing basis. The Financial Clearinghouse 124 manages the complete purchase by performing payment processing for certain transactions and manages purchase reporting and settlement of other transactions where the actual purchase is processes by the Consumer Player.

Managing the Musical Content

Musical content includes sound recordings, as well as related information such as titles, artists, lyrics, producers, videos, interviews, photographs and other promotional materials (audio, audiovisual, textual and graphical data). The system of the present invention receives musical content in various formats and from various sources, including the artists, agents, publishers, producers and distributors (collectively "distributors" since this is typically the most common source). All the musical content is formatted and then stored at the Delivery Service module. In addition, the production system sends select information to the various modules requiring some information about the piece of content. For example, descriptions of the content are sent to the Content Catalog to form a basis upon which consumers may search for content. Similarly, a reference to each item of content is sent to Reference Service so that it may facilitate the retrieval of content from the Production System upon request from a retailer or consumer.

Along with every song or other unit of musical content, the distributor provides business rules which govern the use, sale and distribution of the content. Business rules for a particular piece of content may include price range, conditions of sale and duration of an offer. The retailers then create offers and payment options consistent with the distributor's business rules for the sale and distribution to consumers. The retailers also prepare promotional materials to promote the available content. Alternatively, the distributor may supply the promotional materials. Promotions include, for example, a free sample of music, or an offer to sell multiple items for less than the sum of the prices for the items individually. Payment options include, for example, up-front payment for unlimited use (traditional), usage-based payment (e.g., pay per play), or period-based payment (e.g., play for a day or week). Once an offer is accepted, the terms of the offer are referred to as Rights.

Any single item of musical content, such as one song or one photo, is referred to as a content element. Various content elements may be associated or linked together. For example, a song may be associated with a photo of the artist and the sheet music, in addition to the technical information about the song (title, vocalists, musicians, composers, writers, etc). These content elements may then be bundled together into a package called a Media Object. The same song may also be bundled with some other songs of the same genre to form a collection (such as an album). Every content element is optionally compressed, digitally secured and associated with appropriate rights to form Media Objects. The Media Objects are conceptually digital storage containers which are secured to prevent tampering and ensure enforcement of the rights associated with the stored contents.

In addition to preparing the content elements individually, the Production System generates and maintains a Content Catalog of all the content elements. The Content Catalog is a searchable database containing descriptions of each content element. The Content Catalog may be searched by consumers and retailers as discussed below.

Providing a System for Consumers to Find the Content and Offers

One approach for providing a system for consumers to find content and associated offers is for retailers to sponsor and maintain web sites to attract consumers, advertise their products and facilitate sales. As subscribers to the system, retailers interface with various system modules to participate in and manage the transactions between retailers and consumers. Using a Web Browser operating on a personal computer or a kiosk in a retail store, consumers can view Retail Web Sites to find and obtain selected musical elements. Various offers are advertised on the Retail Web Site and the consumer can select those offers directly. Selecting certain music or an offer at the Retail Web Site activates the distributed system to deliver the content to the consumer and complete the financial transaction between the consumer and the retailer.

The consumer can also search for music by entering a query on the Retail Web Site. The query is passed along to the Content Catalog module which searches the content description database and returns the results. Search results may include titles and descriptions of musical content that satisfy the query and the associated offers and options for obtaining that musical content. The consumer can continue searching until the desired music is found at which point the consumer may select a particular offer for the desired musical content.

Delivering the Content and Enforcing the Terms of the Offers

Once the consumer determines the content they wish to purchase, they select an offer from the selection of offers available through the retailer operating the Retail Web Site. The offer selected by the consumer is then validated to ensure that the offer is still effective. The validation is performed by the Reference Service module upon a request from the Retail Web Site, with the Reference Service being transparent to the consumer.

In order to receive and use the content, the consumer must be equipped with the Consumer Player software. If the consumer does not already have the Consumer Player, then the Retail Web Site requests the Registration Manager to download and activate the software on the consumer's personal computer. The Consumer Player enables the consumer to, for example, save the music on disc, listen to the music, view the images, print the lyrics, etc. The Consumer Player software package also enforces the terms of any associated offer as the consumer uses the content by only allowing such use as is consistent with the acquired offer.

After the offer is validated and the consumer is set up with the Consumer Player, the consumer is ready to receive the selected content. The Reference Service instructs the Delivery Service to commence the download of the content to the user's Consumer Player. The Delivery Service retrieves the content from its database and sends it to the Consumer Player at the consumer's terminal. The Consumer Player receives the content and when the user is ready to complete the purchase (as described below) or use the content, the Consumer Player interacts with the system to ensure compliance with the terms of the offer from the retailer.

Tracking Usage and Settling Financial Accounts

There are many ways in which a consumer can purchase the products received. These include the contract model and the deferred model. The contract model is where the consumer contemporaneously pays for and receives the content and the retailer receives the payment. The deferred model is where the content is transferred to the consumer prior to any financial transaction with the retailer. In this latter scenario, the consumer acquires the offer and content through the retail web site but defers purchasing the music. When the consumer is ready to complete the transaction, the payment is made, the transaction is reported to the retailer and the retailer is paid.

Payments are processed through the Financial Clearinghouse which interacts with the Consumer Player. For example, if the consumer selected a pay-per-use offer and the deferred payment model was applied, the Consumer Player will track when the consumer plays the music, and generate a micro transaction for that usage. The micro transactions are aggregated and sent to the clearinghouse for accounting and reconciliation.

The Financial Clearinghouse also handles the transactions with the consumer's credit card account. In addition, the Financial Clearinghouse credits the retailer, distributor, and content owner (e.g., royalties) where appropriate.

DETAILED DESCRIPTION OF PREFERRED EMBODIMENT OF THE INVENTION

Introduction

Figure 1:
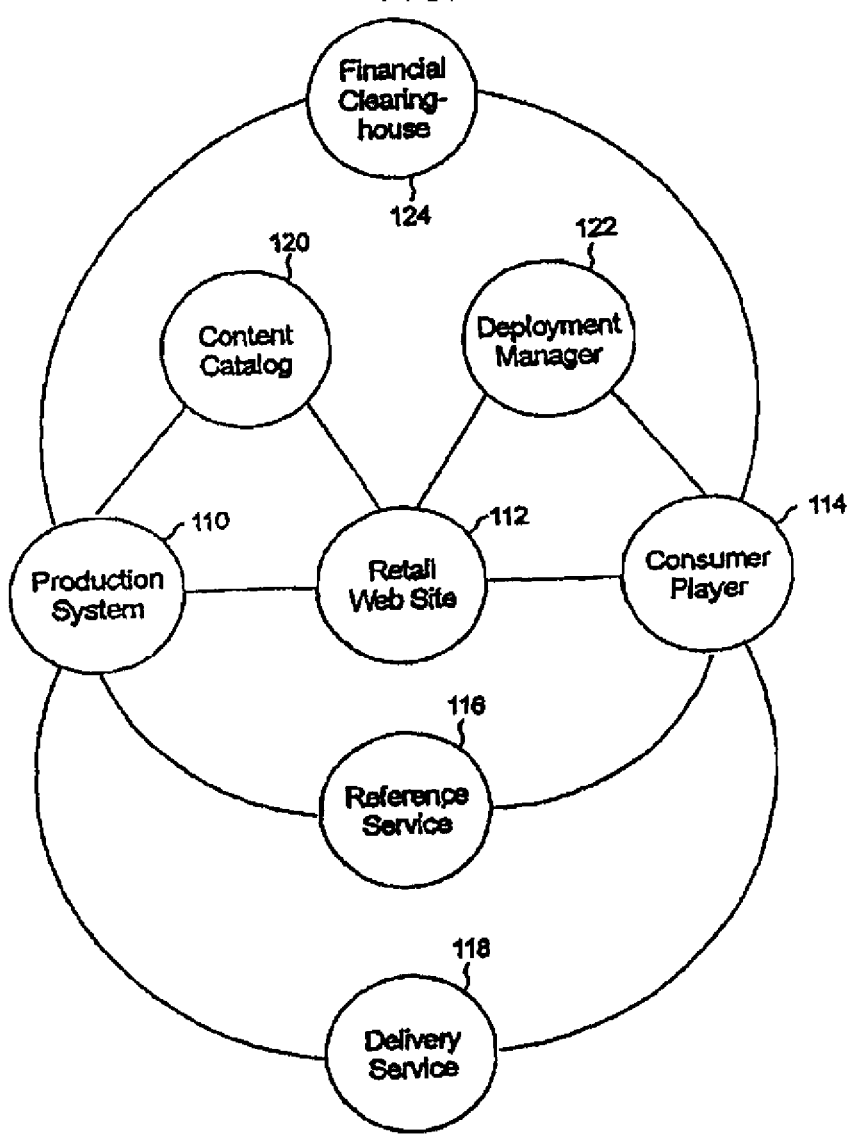
FIG. 1 is a block diagram of an arrangement of modules for implementing the present invention.

In the preferred embodiment of the present invention, the system architecture includes eight modules, as illustrated in FIG. 1: Production System, Retail Web Site, Consumer Player, Reference Service, Delivery Service, Content Catalog, Registration Manager, and Financial Clearinghouse. Each of these modules performs a specific set of related functions while communicating with other modules through specified standard interfaces. The communication interfaces provide a great deal of flexibility in the implementation details of the individual modules. The specific implementation of any individual module may change; however due to the modularity and agreed upon communication interface, the modules will still be able to interact with each other. The modules are defined such that multiple or different implementations of each of the modules can be supported within the standard interfaces.

The Production System 110 maintains mass data content, e.g., music, lyrics and photos, and associated commercial offers and sends the data to the Delivery Service for storage. The Production System also assists retailers in maintaining their web sites and producing offers. The Retail Web Sites 112 are web sites of music retailers who subscribe to the distribution service and provide an environment for consumers to access and purchase music over the Internet. The Consumer Player 114 enables consumers to interact with the system to directly download and purchase music from the Retail Web Site and play and store the music locally while enforcing the business rules governing the purchase arrangement. The Reference Service 116 validates and certifies the retailer's offers and provides the mechanism for consumers to purchase the content by binding it with valid commercial offers. The Delivery Service 118 downloads the actual content and associated rights from its database to the Consumer Player. The Content Catalog 120 is a database optimized for quickly finding the content based on a constrained set of attributes and can be accessed via a query function implemented at the Retail Web Sites. The Registration Manager 122 download the Consumer Player for the consumer the first time the consumer uses the system and maintains the system's security on an ongoing basis. The Financial Clearinghouse 124 manages the complete purchase by performing payment processing for certain transactions and manages purchase reporting and settlement of other transactions where the actual purchase is processed by the Consumer Player.

1. Distributor Creates and Stages Content

Figure 2:
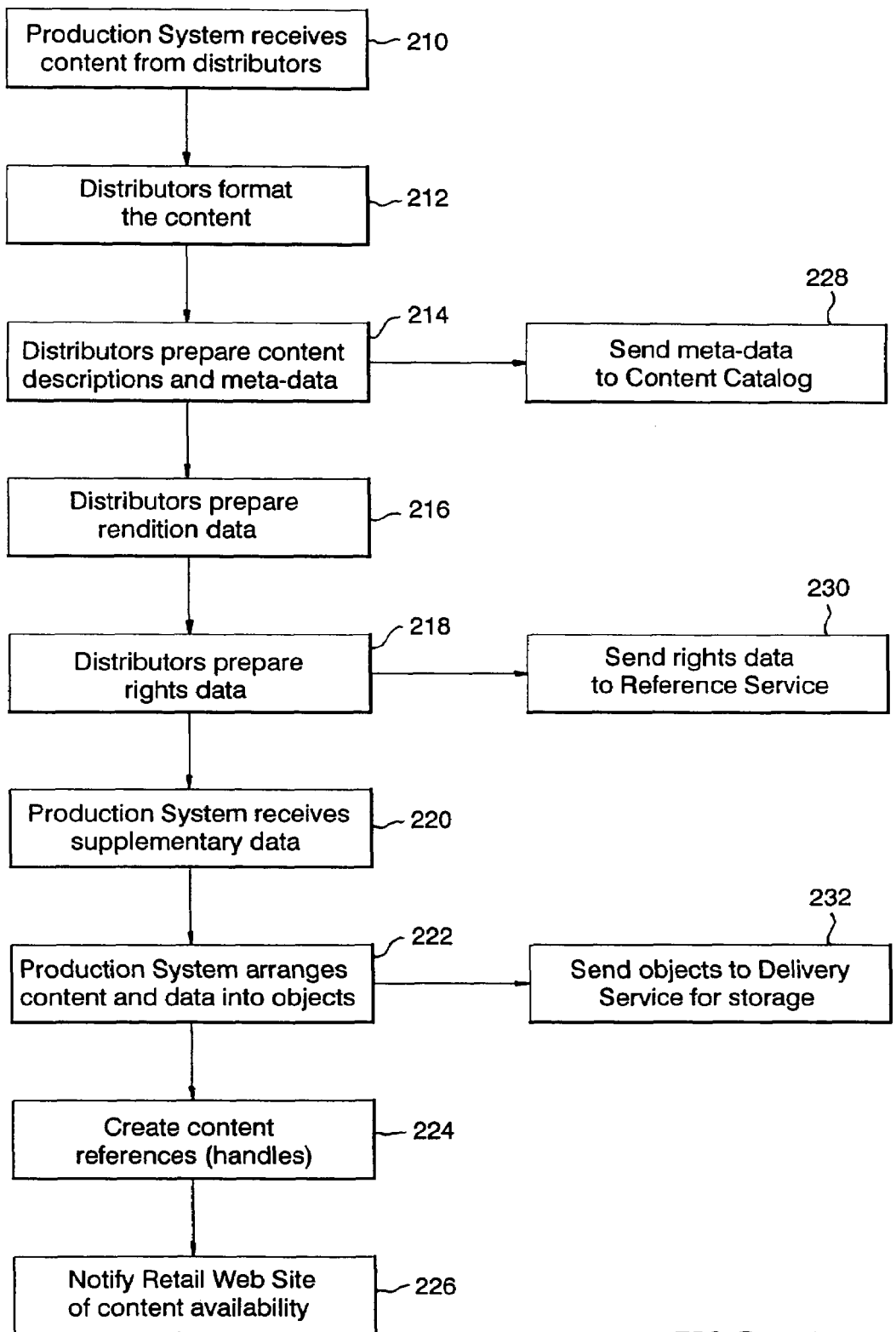
FIG. 2 is a flow chart showing a method for creating content objects in accordance with the preferred embodiment of the present invention.

Referring to FIG. 2, at step 210, the system, specifically the Production System, receives content from content owners, primarily distributors. The Production system provides a mechanism for distributors to prepare their content for distribution through the system. A distributor assembles content elements (including some or all of the audio, video, image and text), encodes and formats them to conform with system requirements (step 212). The distributor also prepares content description and search terms (called metadata) for each content (step 214). The distributor prepares rendition data which specifies the presentation of the content upon use of the content by the consumer (step 216). The rendition data includes, for example, the sequence of playing songs and the association of graphic materials. In addition to the content, at step 218, the distributor creates commercial information such as default rights, and unique identifiers, collectively called rights data and discussed in more detail below. The Production System receives the supplementary information including the content description, rendition data, and rights data from the distributor at step 220. The content and supplementary information are packaged as objects (step 222) (discussed below) and formatted in secure containers so that the content is useable only with authorized software. Each container is then staged for distribution at the Delivery Service which stores the content in a Digital Asset Management database (step 232). A reference to each content as packaged in the containers is created to facilitate retrieving the content (step 224). Information about the content's availability is communicated to the appropriate system modules for cataloging, storage and creation of offers. At step 226, the retailer is notified that the content is available and is supplied with a reference to the content. At step 228, the meta-data (search terms) and content descriptions are sent to the Content Catalog to be used when consumers search for content. At step 230, the Rights Data is sent to the Reference Service to be used to confirm validity of offers for content.

The Production System is largely internal to the distributor, although it encompasses some secure externally accessible elements for content distribution and communication with the retailers. Tools and techniques used in the Production System are the choice of the distributor as long as the prepared content is in accordance with system standards and specifications. The Production System interfaces to the distributors' back office functions which maintains the general ledger, accounting and disbursement of royalties. The distributors' back office functions may be performed by a separate module or incorporated into the Production System or Financial Clearinghouse modules.

For a given piece of music there may be various associated media, such as lyrics, photos, other textual or graphical material, and videos. The distributor configures the content linking together associated media such that when music is selected the associated media are also activated and displayed. In effect, the distributor creates multimedia content based on the original music.

The distributor creates and electronically encodes business rules for how the content can be distributed and consumed. Examples of such rules are "This content can only be sold in Country X", "This song can be purchased outright or offered as pay-per-play but not rented", "To print the lyrics is $1 extra", etc. These rules are included in the Rights data enclosed with the content. When a retailer creates an offer for content available on its web site, the retailer is limited by the distributor's rule enclosed with the content. The retailer is also limited by the specific contractual arrangement with the distributor. (This is discussed in more detail below).

The distributor also creates a default offer for the content and the default offer is included in the Rights data. A default offer provides actual commercial terms for consumers to acquire the content, and may be included with the content where the distributor is also acting as the retailer. A default offer may have no expiration date, i.e., it is valid in perpetuity. The distributor may set prices in the default offer as a function of time. Alternatively, the default prices may be updated periodically or on-demand when the consumer is ready to "consume" the content. The default offer may also be used as a template by retailers assisting in the creation of retail offers.

For most content, the commercial conditions (e.g., calculation of the retailer's commission) are fully described in the appropriate contracts between distributors and retailers. These conditions are also stored in the Financial Clearinghouse for carrying out the appropriate transfer of funds associated with the purchase and/or use of content. For example, the contract between Distributor A and Retailer B may specify a default commission of 10%, increasing to 12% after a certain volume is achieved. However, it is also desirable to have the ability to set a unique commercial condition for a particular piece of content (e.g., on this song the commission is 8%) on a per-retailer basis. The distributor communicates these conditions to the Financial Clearinghouse and to the retailers.

For each content element, the distributor creates meta-data such as keywords, unique identifiers and other attributes by which the content can be searched. Among the associated data that the distributor creates is the Rendition data defining default settings for the user experience when the content is played. For example the Rendition data may include association of certain graphic or video material, a playlist specifying the sequence of playing music and location markers used to "jump" to a designated point in a musical piece.

Promotional material for the content being offered for sale may be prepared by the distributor or retailer. Examples of promotional content include artwork for the retailers, background information about the music, and music samples for retailers and consumers. Promotional content need not be in the system-compatible formats and may be in any format supported by the Retailer.

Figure 3:
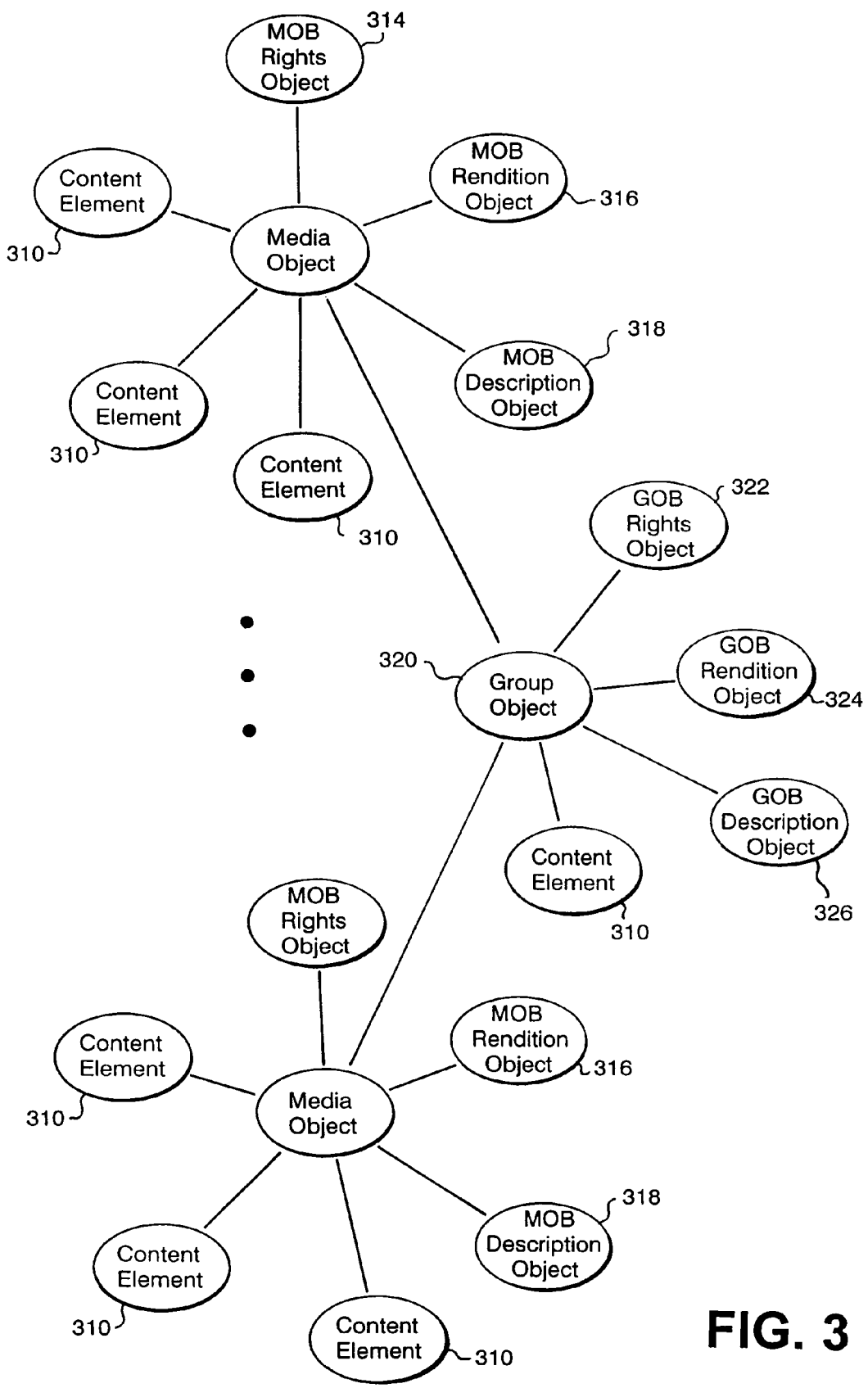
FIG. 3 is a block diagram of an arrangement of content objects in accordance with the preferred embodiment.

The content with supplementary information including rendition, description, and rights data (business rules, default offer) are packaged and stored in secure containers. A secure container is the minimum file that the distributor wants delivered to consumers by the Delivery Service where the file is encoded to prevent tampering. Referring to FIG. 3, the logical organization of the content of a secure container, is referred to as a Media Object (MOB) 312 which is a multimedia presentation based on a single piece of music. Just as pieces of music are combined into albums, a collection of multiple Media Objects can be combined into a larger presentation referred to as a Group Object (GOB) 320. It is generally not necessary to revise the Media Objects in order to create a Group Object, since the creation of a Group Rendition and additional meta-data is sufficient to "tie" Media Objects into a Group Object in most cases.

Media Object 312, for example, includes three content elements 310 which may be a song, the lyrics and photograph of the band. In addition, the Media Object 312 also includes associated Rights 314, Rendition 316, and Description 318.

The distributor has a great deal of flexibility in deciding how to package the content to optimize its business model. For example, if the distributor wishes to offer for sale an album of 10 songs and also to have each (or some) of the songs available for sale individually, the distributor can create 10 individual one-song MOB secure containers each with its own supplementary data, business rules and default offer, and also a ten-song GOB secure container with rendition, description, business rules and the default offer for the entire album. The distributor can also choose to package two or more MOBs in the same container, either because they can only be sold together or for marketing purposes (e.g., consumers who purchase song A also frequently purchase song B, so packaging them together may increase the buy rates and generate more revenue).

Once the content and supplementary information are packaged into secure containers, the content must be staged for distribution. At step 232 (FIG. 2), the secure containers with content, supplemental data, business rules and the default offer, are stored in a Digital Asset Management database at the Delivery Service. The various modules are supplied with various information about the content that is necessary for the processing carried out by each module. At step 230, the rights data (business rules and secure containers with the default offer without retailer identification) are sent to Reference Service. At step 228, the content description and meta-data with search attributes are sent to the Content Catalog to facilitate consumer searches. At step 226, all retailers are notified of the availability of the content and the retailers are provided with content references. Any promotional materials are also sent to the retailers. A selection of the content business rules relevant to creating offers is sent to full-featured retailers. If necessary, unique commercial conditions are sent to the Financial Clearinghouse. The staging area may include a secure server or servers external to the system which can only be accessed by authorized retailers.

2. Establish Full-Featured Retailer

A retailer meeting some minimum set of requirements (e.g., an active web site, and a hardware/software platform) reaches a contractual agreement with a distributor to sell content over the Internet. The retailer is provided with and installs retail tools software which enables the retailer to receive information about the available content, create offers and support consumer queries for content. The retailer is then registered in the system. Based on the contractual agreement, there may be restrictions on how the retailer can make offers. This is discussed in more detail below.

Figure 4:
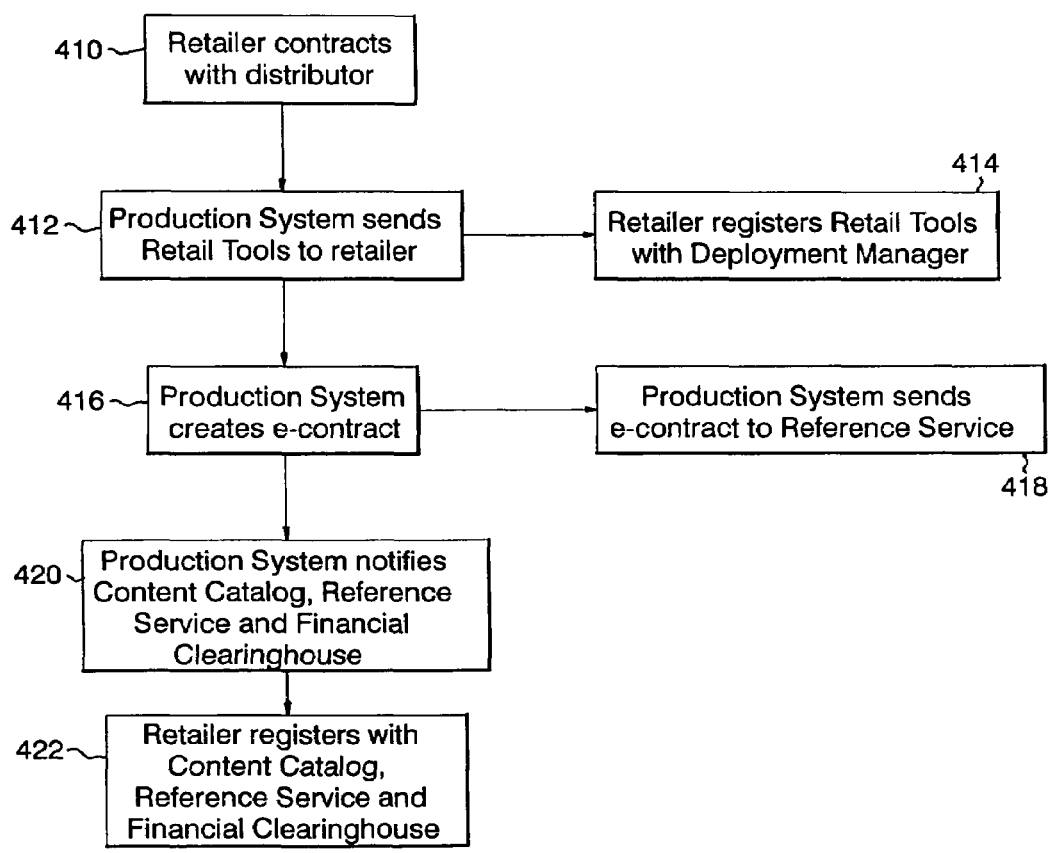
FIG. 4 is a flow chart showing a method for registration of retailers in accordance with the preferred embodiment.

Referring to FIG. 4, therein is illustrated the process of registering retailers. The retailers register with the system by contracting with one of the authorized content owners, generally distributors (step 410). To establish a fully featured retailer, the distributor equips the retailer with retailing software called Retail Tools (step 412). Retail Tools are used to register the retailer with the system and may be distributed on a for-profit basis. The Retail Tools package is software consisting of Query Tools Engine and Offer Creation Tools which includes Rights Management System (RMS). The Retail Tools can be obtained from a licensed outside Tools Distributor and/or from one of the Production Systems. The two main modules of the Retail Tools are the Offer Creation Tool for creating offers and the Query Engine Tool for supporting consumer queries. Additionally, the Retail Tools support a number of other functions, including retail account registration and maintenance, payment clearing (via Financial Clearinghouse), interface to retailers' e-commerce systems, consumer care, etc.

Once the retailer receives the Retail Tools, the retailer may be registered with the distributor and given a financial account. The retailer may then sign up with additional distributors. The retailer registers the Retail Tools with the Registration Manager (step 414). The Production System creates an E-contract based on the contractual agreement between the retailer and distributor (step 416). The E-contract is then sent to the Reference Service which assists in enforcing the terms of the contract (step 418). After the retailer is set up to interact with the system, all the modules are introduced to the retailer. To inform all the modules of the incorporation of a new retailer, the Production System notifies the Content Catalog, the Reference Service, and the Financial Clearinghouse of the new retailer (step 420). The retailer then registers with these three modules directly, providing additional information where appropriate (step 422). The Content Catalog interacts with the retailer when the consumer submits a query on the Retail Web Site. The Reference Service interacts with the retailer when providing the consumer with offers for content. The Financial Clearinghouse interacts with the retailer to settle accounts for the transactions that originated at that retailer's Retail Web Site.

The retailer enters a contractual arrangement with a content owner, namely, a distributor, to establish the rules for the retailer to sell content from that distributor. Based on the contract, the distributor (via Production Systems) creates an electronic contract (E-Contract) which is a set of rules against which the retailer's unique offers can be evaluated for validity. The E-Contract is sent to the distributor's Reference Service.

The distributor (via Production Systems) creates a Notification Set for the retailer. The Notification Set includes a unique retailer identification number (Retail ID), a set of rules for making offers for the distributor's content and a suggested clearinghouse. To keep the Retail ID unique, distributors may be allocated blocks of ID's (e.g., by the first N digits of the Retail ID). The Notification Set is sent to the retailer for use in communicating with other modules and in making offers.

The Production System also notifies the Registration Manager, Content Catalog and the Financial Clearinghouse of the Retail ID. As a result, the Registration Manager can authorize the Retail Tools when the retailer requests such authorization. The Content Catalog will process queries from the Retail Web Site associated with the Retail ID and the Financial Clearinghouse will recognize the Retailer ID and process transactions for that retailer. In addition, the Financial Clearinghouse receives the commercial conditions for processing the transactions for that retailer, for example, the rules pertaining to retailer compensation (e.g., commissions). Alternatively, it may be possible to carry all the commercial information in the offer itself.

Based on the Notification Set, the retailer sends a request to the Registration Manager to register the Retail Tools. Since the Retail Tools contain the Rights Management System (RMS), their registration requires a cryptographic session to enable the RMS. Each instance of Retail Tools is initially activated by the Registration Manager. The Retail Tools will always communicate with the Registration Manager for RMS maintenance, involving periodic cryptographic updates of the RMS to assure system security integrity. The RMS protects the content from unauthorized use and therefore any processing related to the RMS requires security, typically employing cryptography.

The retailer registers with the distributor's Reference Service to verify the retailer's identity and right to make offers. The Reference Service registers the retailer and sends an acknowledgment back to the retailer. The retailer also registers with the Content Catalog to subscribe for queries and Content Catalog acknowledges subscription.

Preferably, the retailer has a financial account associated with the system. The Financial Clearinghouse establishes a financial account for the retailer upon request from the retailer. The retailer can participate in the system without having an account with an associated clearinghouse if the retailer limits its offers to "contract" offers and use its own clearing mechanism. For other selling mechanisms, ("deferred" offers and "contract" offers using as associated clearinghouse) the retailer needs to either have an account with a Financial Clearinghouse or rely on the Content Owner for payments.

When the Financial Clearinghouse requests validation of the retailer the Production System validates the retailer to the Financial Clearinghouse by submitting the Notification Set. The rules pertaining to retailer compensation (e.g., commissions) are communicated to the Financial Clearinghouse in the Notification Set. The Financial Clearinghouse establishes an account for the retailer and sends an acknowledgment back to the retailer.

3. Retailer Creates a Retail Offer

A Full-Featured retailer will be able to use its Offer Creation Tools to create unique retail offers on available content subject to its contracts with the distributors and subject to the business rules associated with the specific content. A Retail Offer includes rules governing how consumers can acquire rights to the content under certain conditions, including validity period, payment, type of consumption—unlimited use, N plays, time-limited plays etc. Both "markup" (retailer adds $X to the wholesale price) and "commission" (retailer is paid X % of the retail price) models may be exercised. Offers can be "contract" or "deferred". Contract Offers (C-Offers) require payment prior to downloading of the content, while Deferred Offers require payment on consumption. The rules are packaged securely to prevent tampering and fraud.

The preferred embodiment is described with reference to offers created by the retailer. It should be understood that other members of the distribution chain and/or consumption chain may create offers or be effected by offers. For example, a software development company or a cable network company may participate in the creation of offers independently or in conjunction with a retailer or distributor. Another example where other parties may be involved in the offers and receive a subsequent benefit of royalties is superdistribution where a consumer distributes content to other consumers.

The Retail Offer is packaged and may exist separately from the content. The Retail Offer is delivered to the consumer separately from the content and is "combined" with the content at the point of purchase, i.e., at the consumer's Consumer Player. Only the default offer remains with the content at all times. As there are multiple retailers, a consumer can download multiple Retail Offers for the same content. Which of the valid offers actually gets exercised is at the consumer's discretion.

A Retail Offer uniquely identifies the retailer and the Content that is subject to the Retail Offer. The Retail Offer is checked for validity and certified by the Reference Service which holds the details of the retail offer within its databases. The Retail Offer is placed on the retailer's web site so that it is made available to consumers.

Figure 5:
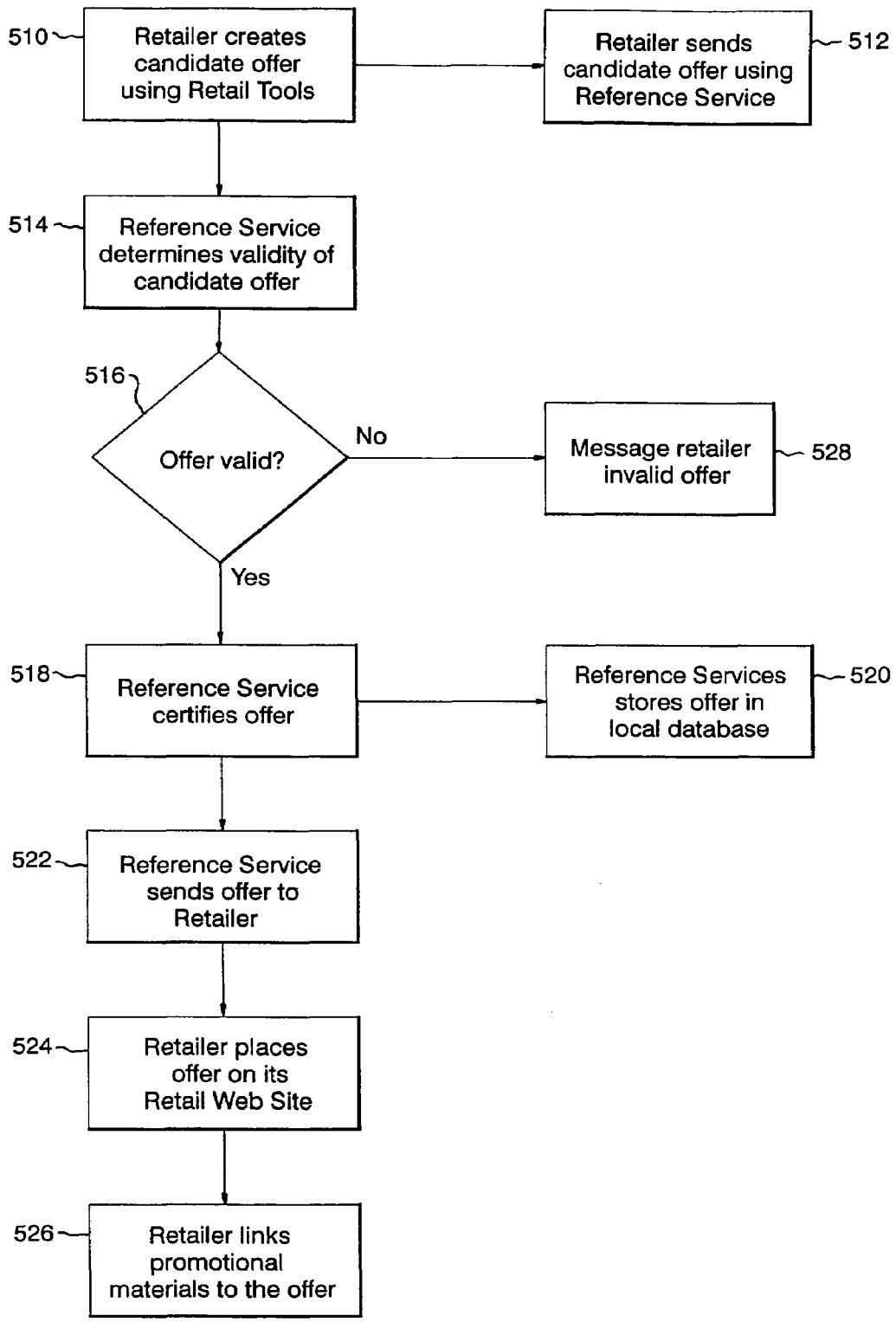
FIG. 5 is a flow chart showing a method for creating an offer in accordance with the preferred embodiment.

Referring to FIG. 5, the first step in creating an offer for consumers to acquire content is that the retailer creates a candidate offer (step 510). The candidate offer is an offer proposed by the retailer for the distributor's certification. The retailer next sends the candidate offer to the Reference Service for validation (step 512). The Reference Service determines the validity of the candidate offer (step 514). If the offer is valid the Reference Service certifies the offer (step 518) and stores it locally (step 520). In addition, the Reference Service sends the certified offer back to the retailer (step 522). The retailer may then place the offer on its Retail Web Site (step 524) and optionally, link promotional material to the offer (step 526). However, if the candidate offer could not be certified because, for example, it failed to comply with a distributor requirement, the Reference Service returns a message to the retailer informing it that the candidate offer was not valid (step 528).

The retailer is provided with the Offer Creation Tools with the RMS and the content-specific business rules received from the distributor which are used to provide a template to fill out the offer's conditions which will be automatically checked against the business rules. The retailer can create multiple or different offers for the same content. The retailer or consumer may specify whether the offer is for a "contract" transaction or "deferred" transaction.

In order to become valid, the offer (initially a "Candidate Offer") needs to be certified by the content owner whose content is being offered. If the offer specifically refers to content from multiple distributors, all of them need to certify it. The network of Reference Services (RS's) may perform this process transparently to the retailer, for example, RS1 sends the candidate offer to RS2 for signature, RS2 sends it to RS3, RS3 signs and return to RS1. Alternatively, the functionality may be incorporated in the Retail Tools.

The Reference Service validates the "Candidate Offer" and creates a certified Retail Offer. The Reference Service checks the "Candidate Offer" against the E-contract and the content-specific business rules. If the offer is consistent with the offer and the rules, it is electronically certified. The term "certification" as used here means ensuring that any subsequent modification of the offer may be detected. It does not imply any specific technology—RMS-based, token-based, digital signature, digital certificate, combination of signature and certificate, etc.

If the offer includes content from a number of content owners, multiple Reference Services may need to certify it. This may be implemented, for example, by the first Reference Service being responsible for contacting the others and collecting their signatures/certificates.

The Reference Service returns a certified Retail Offer to the retailer, who in turn places the Retail Offer on its web site. How the Retail Offer is incorporated into the retailer's web site is at the retailer's discretion. The Retail Offer may be incorporated into a content reference, so that when the consumer clicks on a content reference, the consumer's player is invoked and the offer is downloaded to the client. Finally, the Reference Service stores the Retail Offer in its database which includes all the offers to its content.

The retailers will typically not be allowed to make offers in perpetuity, i.e., Retail Offers will generally have an expiration date. The allowed duration of the offers can be determined by the contract between the retailer and the distributor and by content-specific business rules. However, retailers can renew it retail offers upon request. For the cases where the retailer wants to renew an offer without any changes, this may be implemented automatically via the Retail Tools. For example, the Retail Tools may include an option for automatically requesting renewal of an unchanged offer, i.e., unchanged except for the expiration date.

3A. The Reference Service—Offer Management

The modules that play the primary role in managing commercial Offers are the Production Systems, the Retail Web Sites and the Reference Service. These modules are supported by one of the key system elements, the Rights Management System (RMS), which manages the Offers with respect to the consumer's use and/or transfer of content, specifically RMS facilitates interpretation and execution of the offers.

In addition to the Rules for use of content, the Rights Management System will be used to create Business Rules Objects which define how the content can be processed and transacted upon within the system. There can be multiple layers of rules to reflect the complexity of business relationships. The Default Business Rules enable access to content as constrained or allowed by the content owner and/or distributor. The Default Business Rules are generally packaged with the content and each Content Object typically has one and only one set of Default Business Rules directly associated with it. The Default Business Rules can be layered according to the content objects' hierarchy of Group Object (GOB) at the highest level, Media Object (MOB) at the intermediate level, and Content Element (CEL) at the lowest level. The Default Business Rules will include a Default Offer which can be described as the "list price" of the content being offered by the distributor. Any time after the consumer receives the content, which is accompanied by a default offer in the typical course of processing, the consumer continues to retain the option of repeated use the content in accordance with the default offer. To support this option for the consumer, the default offer may be used to generate a current price applicable each time the consumer uses the content.

The retailer defines commercial offers from the retailers to consumers, which are called Retail Offers. Each offer applies to specific content but may be physically separate from the content. Offers may (though not necessarily) be bundled together with specific content for delivery to the consumer. Preferably, the content references (discussed below) includes an offer (possibly selected by the consumer) and the content is actually delivered independently at a later time. Multiple Retail Offers can be associated with a content object and vice versa.

There may be a number of types of retailers within the system. The retailers may be full featured (also called equipped or enabled) retailers, by licensing software (Dynamic Offer Creation Tools, Content Catalog Query Tools) which allows them to create content offers on-site and provide consumers with Content Catalog queries. Affiliate Retailers are retailers not equipped with such tools and rely on the Production Systems to create Offers for them. Affiliate Retailers may also have on their sites "Default Offers" personalized for them and/or content references to such offers. The full featured Retailers can sell content they did not create offers for by utilizing the "Default Offers". Other full featured Retailers may choose to not have Dynamic Offer Creation Tools on-site but to use a secure offer creation site provided by a distributor. The goal is not to mandate a specific form of Retail participation but to allow Retailers to position themselves as they see fit.

References for the content may take the form of encapsulated files which are processed by the Consumer Players. The content reference can reside anywhere in the system and can be transmitted in super-distribution (e.g., as e-mail attachments). The content reference files generally have "secure areas" to protect against theft or tampering of the enclosed information. Retail Offers are typically carried within the content references in a secure (read only) manner.

There are at least two types of settlement transaction in the system: Contract, which is settled at the time of or prior to distribution, and Deferred, which is settled upon consumption of the content. In a Contract transaction, the consumer pays and receives the product. The Deferred transaction is settled during or after the consumption by a compliant Financial Clearinghouse. The immediate transaction may be between the consumer and the Consumer Player, subject to the consumer's available budget and the content's rules, eventually to be reported to and audited by a Financial Clearinghouse.

One aspect of Offer creation is secure packaging of the assigned Rights, sometimes performed dynamically ("on-the-fly"). This is performed by the appropriately enabled version of the Rights Management System. Content Creation tools may be used by the distributor to create the Default Business Rules and Default Offers and a constrained set of these tools may be used by the Retailer to create the Retail Offers.

Another aspect of offer creation is "synchronization" of various Business Rules associated with the content. The music industry with its complex web of business relationships currently requires multiple levels of "Rules"—Artist's, Labels, distributor's, Retailer's. Within the system the upstream Rules, i.e. those representing the relationship between the distributor, Labels and the Artists are generally not propagated throughout the system. These "Rules" may be represented as a set of Default Business Rules constraining the content. This may include limitations on the packaging, geography, price levels, time or other constraints. Further, in some countries there may be implications for other "Rights" holders, such as the Performing Rights Societies or Mechanical Rights Societies, to have the distributor act as the collection agent for these rights with the obligation to pay immediately and directly the payments due to these societies. In the system, the rules may be layered to represent the constraints and obligations of each rights holder within differing countries or regulatory regimes. For example, first artist's rules and or any other obligatory rights holders, then distributor's (which jointly comprise the "Default Rules"), as a set of Rules which govern the content.

Within the system, these various Rules are consistent with each other and discontinuities and disconnects are not created. For example, there should not be a situation where the Default Rules say "songs in this album are not individually purchasable" while the Retailer Offer says "buy any of the songs in this album for $1.00". There are two levels of the checking the consistency of Rules: 1) by the Offer Creation Tools against the business rules which were made available to those tools (e.g., the Default Business Rules), and 2) by the Reference Service against the contracts and other information available to it. In this example the Retail Offer would be deemed to be invalid, and as such, rejected either by the Offer Creation Tools or (if not detected by the tools) by the Reference Service.

There are several criteria against which Offer validation is measured. Different subsets of these criteria are checked at different points in the System depending on the particular activity, e.g. Offer certification, Offer validation, invalid Offer resolution, Reference resolution, etc. The following list of offer validation criteria is not exhaustive but is intended to indicate the types of checks that can be performed in the system: Is there a relationship with the Retailer? Is the Retailer allowed to sell the Content? Is the Retailer allowed to sell this Content in the specified manner (outright, rental, one-play)? Is the price within the contractual constraints? Is the expiration date appropriate? Is the payment mechanism appropriate? Is the distribution channel appropriate? Has the contract been revoked (canceled, changed)? Has the Offer been tampered with? Has the Offer been revoked (by distributor or retailer)? Has the referring RMS been designated as suspicious? One of the purposes of the Reference Service is to provide a strong control mechanism to allow the Content Owners to better manage these events.

There are several principal mechanisms for making sure that the retail offers are valid: 1) the Offer creation tool checks for logical consistency between the Candidate Offer and the business rules (e.g., the Default Business Rules) associated with the content, 2) pre-packaged "Offer forms" limit the Retailer's ability to create Rules inconsistencies, and 3) the certification process where the Retailers' offers are validated based on distributor-retailer contractual relationships. These mechanisms may be automated in a dynamic environment to be effective. All the mechanisms are interdependent. Relevant Default Business Rules may be available to the Retailers during the Offer creation stage and that, while the Retailers are able to create their Offers themselves, in order to be "valid" these Offers have to be certified (against the contractual constraints) by the distributors of the content involved.

This Offer certification process will be conducted by the Reference Service. Each Retail Offer which involves Content from a specific distributor is securely communicated to the Reference Service of that distributor (Retail Coupons which are not distributor-specific, e.g., "buy 10 items from Retailer X, get free movie tickets", do not have to be certified). The Reference Service verifies that the offer is consistent with the contractual agreements and "signs" the offer. Thus, the Reference Service knows all the currently valid offers (both Retail and Default) for the content it references.

There are two types of objects that require resolution into valid Offers: invalid Offers and References. As noted above, References identify content and do not contain Offers. Invalid Offers are effectively a form of References, in that they identify content and do not contain valid Offers. In both cases, the desired result is that if possible, a content identification object that does not have a valid Offer is resolved into one that does have a valid Offer.

The resolution process may be performed by the Reference Service as follows: 1) Determine which Retailer created the Offer or Reference. 2) If there is no longer a relationship with the Retailer, provide the Content Owner Default Offer for that piece of content, otherwise determine business rules for resolving References for that Retailer. 3) If the business rules allow the Retailer to satisfy the request, provide the Retailer's Offer for this content (which at a minimum will be the Default Offer being made on the Retailer's behalf), otherwise provide the Content Owner Default Offer.

When the consumer's RMS detects that an Offer is invalid, typically, the reason for the invalidity is that the Offer has passed its expiration date. In this case if a consumer attempts to use such an Offer and they have the content already on their local machine, the Consumer Player proposes the Default Offer enclosed with the content, or propose to request a valid offer from the Reference Service. If the consumer does not have the content, then the Reference Service attempts to find the most similar Offer from the original Retailer if it still has a business relationship with this Retailer. Otherwise, the content may be offered at the "list price" (i.e. the Default Offer) with the distributor acting as a retailer.

An Offer might also be invalid because it has an improper certificate. Generally, such a problem may be caught by the player's RMS, but it may be forwarded to the Reference Service to determine whether there was a transmission error or whether it was a fraudulent attempt.

The Offer may be RMS-valid but not system-valid. A typical situation is where an offer which has not expired but has been revoked because, for example, the underlying contractual conditions have changed. There may be some cost associated with processing of such offers, which may be incurred either on the "front end" by performing an extra validation step or on the "back end" using clearinghouse and customer care. This is perceived as a trade-off area where the most cost-effective approach from the overall business perspective solution may be adopted. The processing is as follows: 1) if a Consumer attempts to use such an Offer and they has the associated content on the local machine, the Consumer Player allows the transaction to proceed and the issue may be resolved on the "back end" using clearinghouse and customer care; 2) if a Customer does not have the content locally, the Offer may be validated as a part of the downloading process. If the Offer is determined to be invalid, a replacement Offer is suggested.

4. Consumer Acquires an Offer and Content

Consumers can find content on the Retail Web Sites and then select an offer to purchase the content. The consumer browses the Retail Web Site where the retailer displays various content and content/offer combinations. The consumer can find more offers by clicking on references to content found on the web site. The consumer can also use the query function on the web site to search the Content Catalog for content that is available but not listed individually on the web site. To search the Content Catalog, the consumer enters various keywords that are sent to the Content Catalog module. The Content Catalog will return a list of the content whose description or meta-data matches the keywords from the request. If the consumer does not find the desired content among the search results the consumer can modify the search request and resubmit it to the Content Catalog.

Figure 6:
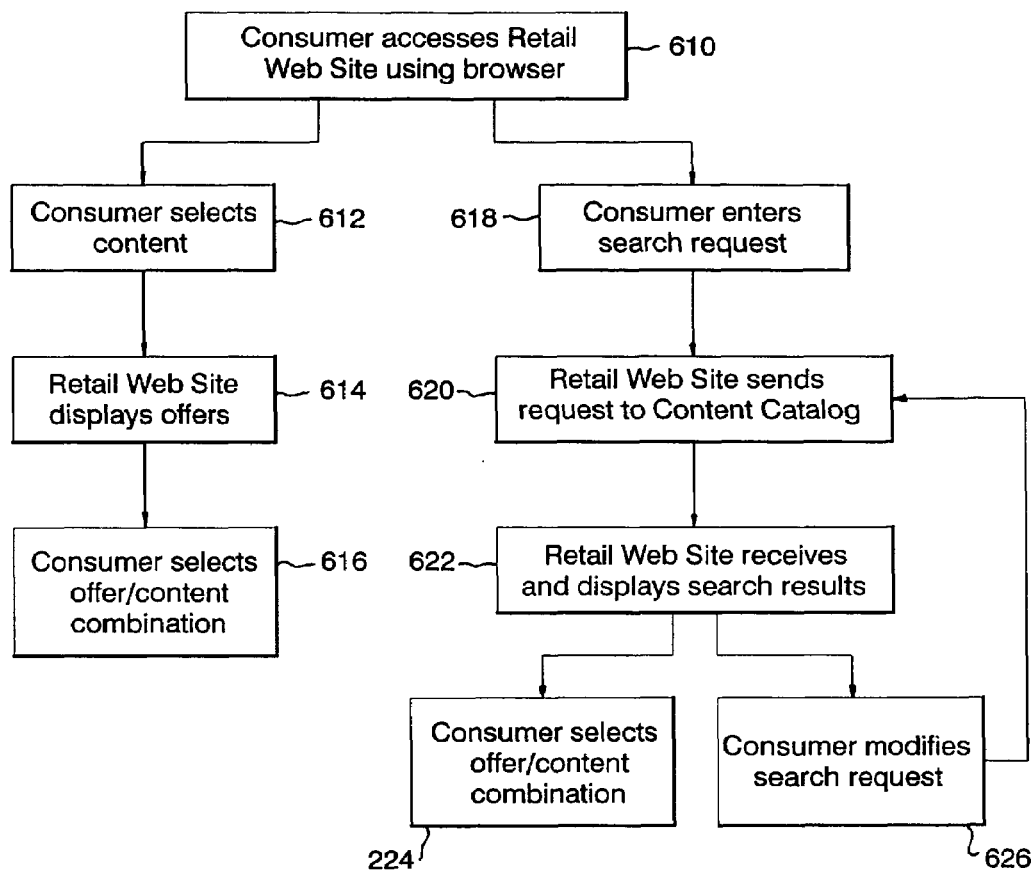
FIG. 6 is a flow chart showing a method for browsing for content in accordance with the preferred embodiment.

Referring to FIG. 6, the consumer accesses the Retail Web Site using a conventional Internet browser (step 610). The consumer may select content that is listed on the Retail Web Site (step 612). The Retail Web Site displays offers for the content selected by the consumer (step 614), the offers being the ones that were previously certified by the Reference Service. The consumer may then select an offer for particular content (step 616). The consumer may also search for other content not already displayed on the Retail Web Site. To do this, the consumer enters a search request (step 618) which the Retail Web Site forwards to the Content Catalog (step 620). The Content Catalog searches its database of content descriptions and meta-data, compiles a list of content that satisfies the query terms, and transmits the results to the Retail Web Site. The Retail Web Site receives the resulting list from the Content Catalog and displays it for the consumer (step 622). The consumer may then select a content/offer combination (step 624) or modify their search request to continue looking for content (step 626).

Once the consumer finds content and an offer for the content, the consumer submits a request for the content and the offer at the Retail Web Site. When the consumer selects the content/offer combination, and the consumer does not have a Consumer Player, the Retail Web Site will initiate the Registration Manager to download and activate a Consumer Player at the consumer's personal computer.

Figure 7:
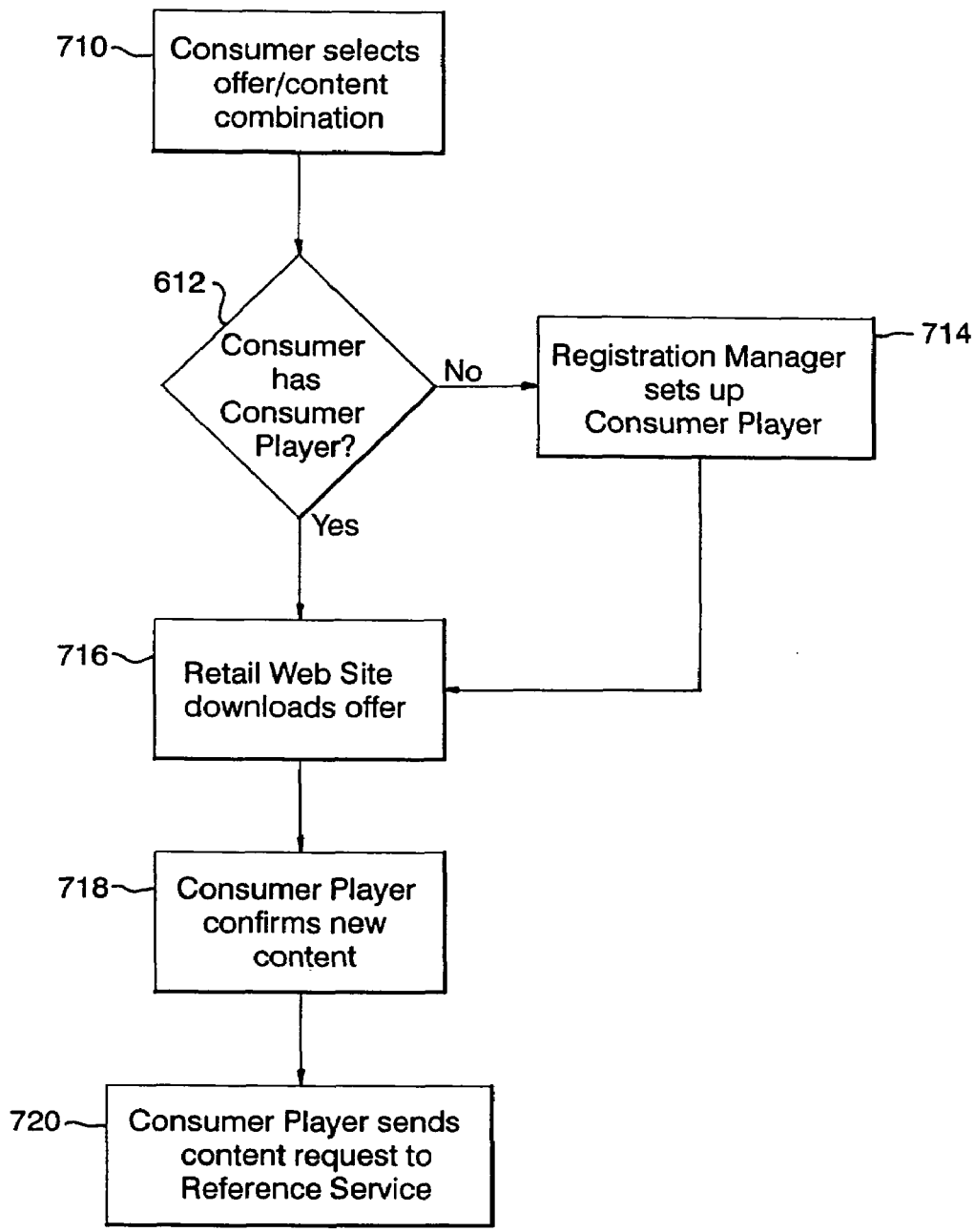
FIG. 7 is a flow chart showing a method for requesting content in accordance with the preferred embodiment.

Referring to FIG. 7, the consumer selects an offer for particular content (step 710). If the consumer does not have the Consumer Player (software that facilitates the consumer's use of the content), the Registration Manager sets up the Consumer Player (step 714). The Registration Manager downloads the Consumer Player software package to the consumer's personal computer where the software installs itself. The Registration Manager also registers the Consumer Player and sends information to the Financial Clearinghouse to set up an account for the consumer associated with the Consumer Player. The registration may be at the consumer level or the Consumer Player level but the financial account must be associated with a consumer having appropriate credit capabilities. The Financial Clearinghouse interacts with the consumer directly to obtain the necessary financial and other information to set up the account. Finally, the Financial Clearinghouse establishes an appropriate budget level for the consumer. The budget level is sent to the Consumer Player and is used in processing transactions locally as described below.

Figure 8:
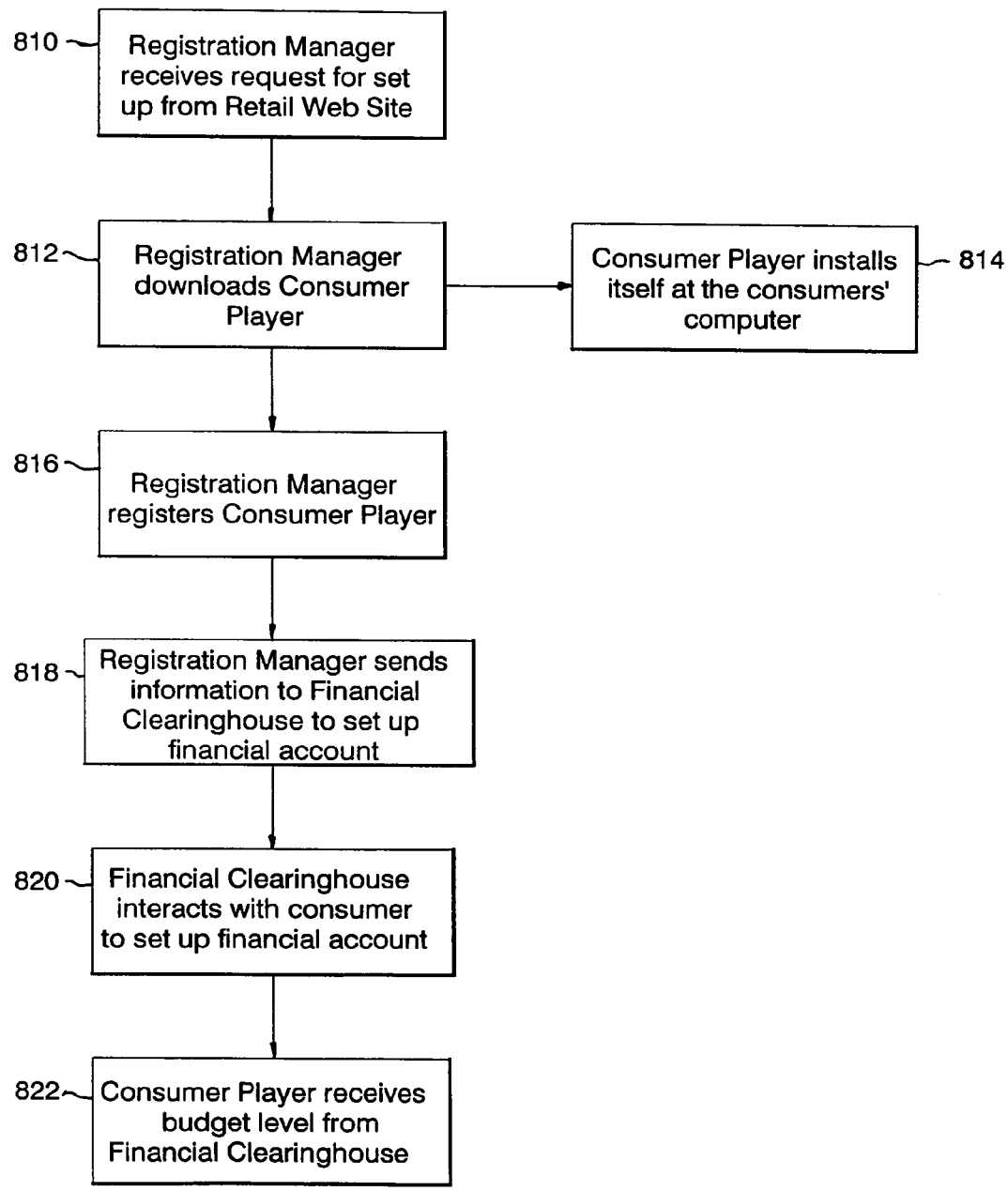
FIG. 8 is a flow chart showing a method for downloading the consumer player in accordance with the preferred embodiment.

Referring to FIG. 8, the Registration Manager receives the request to set up a Consumer Player for the consumer (step 810) where the request may come from, e.g., the Retail Web Site or a CD. The Registration Manager downloads the Consumer Player software (step 812). The Consumer Player installs itself at the consumer's computer (step 814). The Registration Manager then registers the Consumer Player (step 816) and sends introduction information to the Financial Clearinghouse to set up an account for the consumer (step 818). The Financial Clearinghouse interacts with the consumer to set up the account where the consumer provides, for example, credit card information (step 820). The Financial Clearinghouse determines a budget for the consumer and the Consumer Player receives the budget level from the Financial Clearinghouse (step 822).

Returning again to FIG. 7, after the consumer is provided with the Consumer Player, the Retail Web Site downloads the offer that the consumer selected (step 716). The Consumer Player confirms that the specified content is not already resident at the Consumer Player, i.e. that the content is new to the consumer (step 718). The Consumer Player sends a request to the Reference Service to process the consumer's request for the specified content.

Figure 9:
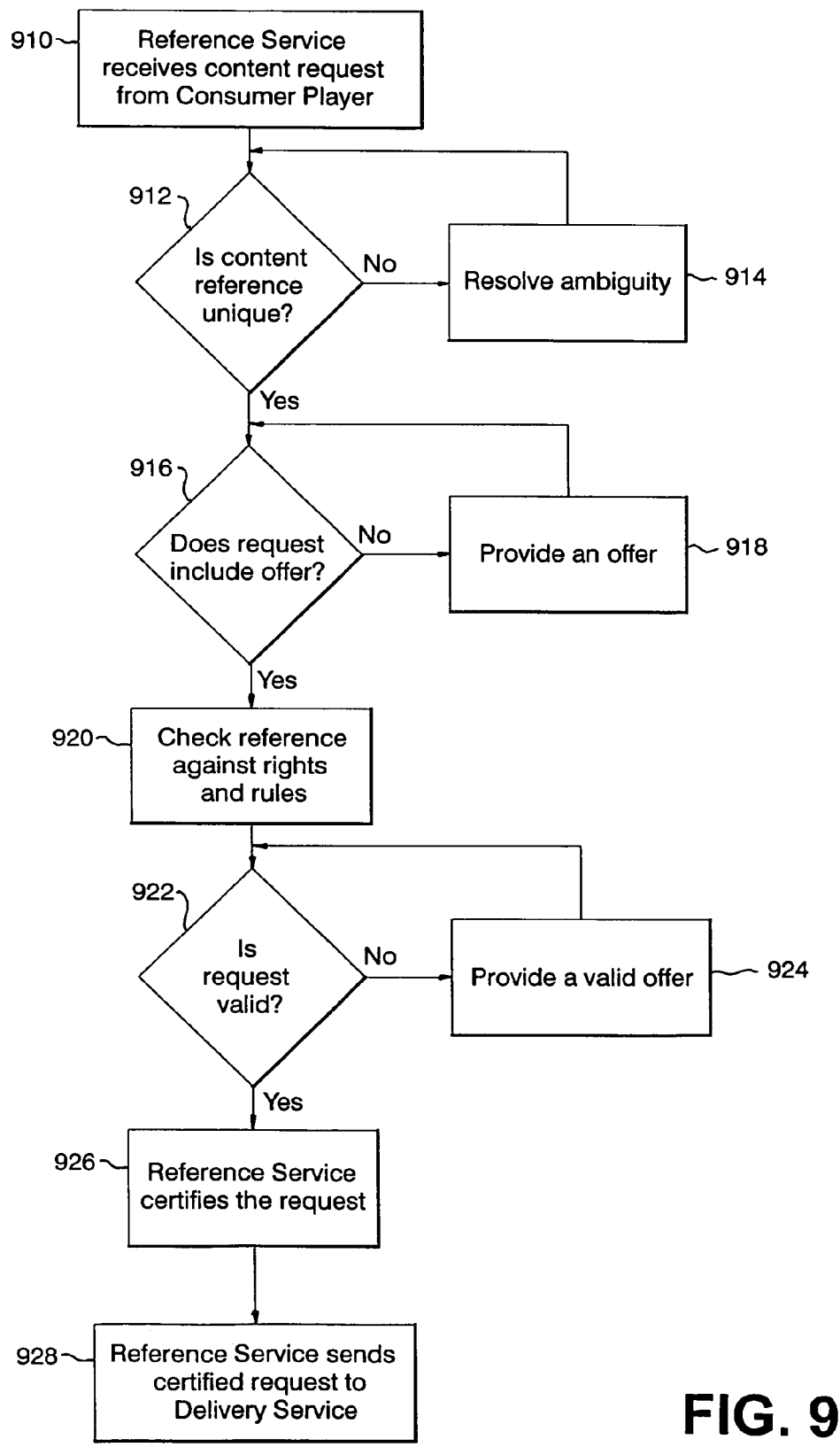
FIG. 9 is a flow chart showing a method for processing a content request in accordance with the preferred embodiment.

Referring to FIG. 9, the Reference Service receives the content and offer combination request from the Consumer Player (step 910). The Reference Service determines whether the reference to the content is unique and unambiguous (step 912). If the content reference is ambiguous, the Reference Service will resolve it according to a predefined business algorithm (step 914). Next, the Reference Service determines whether the request is accompanied by an offer (step 916). If an offer is not provided, the Reference Service supplies one based on the default rights or offers associated with the content requested (step 918). Next, the Reference Service checks the offer against the rights associated with the content and against the business rules for the retailer to determine whether the offer is valid (step 920). If the offer is not valid, the Reference Service attempts to correct any problem that may arise and provide an alternative offer if necessary (step 922). The Reference Service then certifies the request (step 924) and sends the certified request to Delivery Service (step 926).

Figure 10:
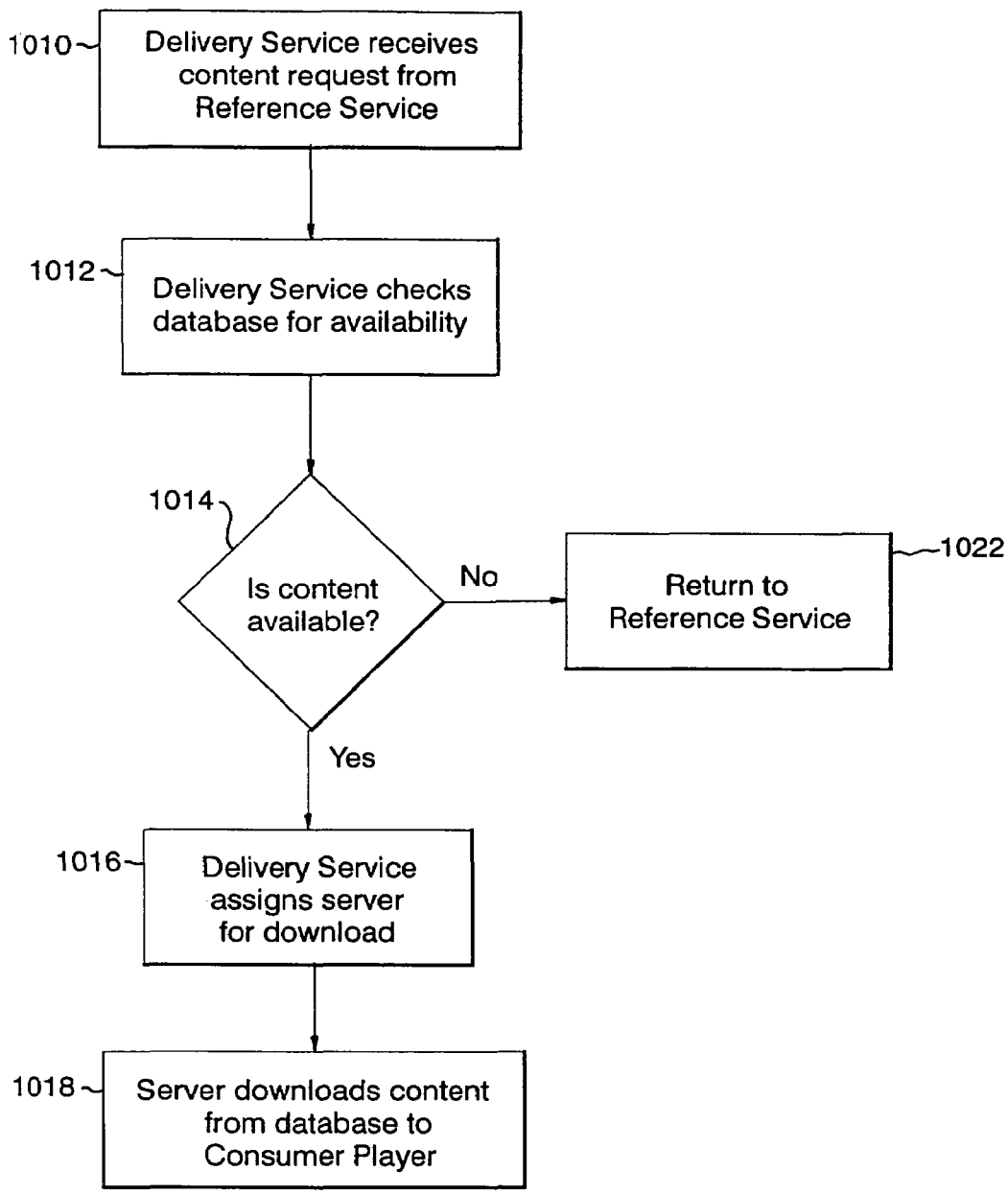
FIG. 10 is a flow chart showing a method for acquiring content in accordance with the preferred embodiment.

Referring to FIG. 10, the Delivery Service receives the content request from the Reference Service where the request includes a unique reference to content (step 1010). The Delivery Service checks the database to determine whether the content is available (step 1012). In the rare instance that there is a reference to content but the content does not exist or has been removed from the database of content maintained by the system, the Delivery Service returns an error message to the Reference Service which may be able to substitute other content or report back to the consumer (step 1022). Provided the content is available, the Delivery Service assigns a server to download the content to the Consumer Player (step 1016). The server proceeds to download the content received from the database to the Consumer Player (step 1018).

4A. The Content Catalog

As the consumer browses the Internet, the consumer may find a Retail Web Site of a full-featured retailer which allows the submission of queries for available content. If a user submits a query, a search is performed, with the search results indicating references to available content which meet the search criteria. The consumer may then choose a reference and is provided with a retail offer from the retailer whose site was used to conduct the query. Using this mechanism retailers with the appropriate tools can sell a large variety of content, whether or not they created offers for it. However, the retailer must have the Query Engine of the Retail Tools in order to provide this functionality. The Query Engine allows the retailers to search the Content Catalog and to personalize (with the RID) the references returned by the Content Catalog. The actual resolution of references into retail offers is performed by the Reference Service. However, retailers are able to modify the process by creating extensions to the Query Engine—for example, search results can be filtered according to the criteria set by the retailer, the retailer can intercept query results (references) and return to the consumer actual offers instead, etc.

As the consumer browses a full-featured retailer's site, they may find the query page, and define and submit a query. The query page is a front end interface to the Query Engine. The actual presentation of the query page is at the retailer's discretion, although the "basic" page will be provided to the retailer with the Retail Tools. The retailer's Query Engine formats a query and submits it to the Content Catalog.

The Content Catalog first verifies that the request is valid, e.g. that the request came from an authorized retailer, and then searches its database of content descriptions based on the search attributes and returns a list of references to the retailer's Query Engine. Each reference indicates a distributor and a purchasable unit of content.

The Query Engine personalizes the references by inserting an RID and displays the references to the consumer. Generally the references do not have price information, however the Content Catalog may be implemented to include price data. If it is deemed to be necessary to display the price information, the Query Engine can contact the Reference Service and retrieve offers. This is largely a user experience decision and can also be implemented as a retailer option.

When the consumer chooses one of the references, the Consumer Player contacts the appropriate Reference Service with a request to resolve the reference. The Reference Service returns a retail offer to the consumer for the content specified by the reference. The Reference Service utilizes a defined business algorithm, such as, return the current offer from the retailer RID if available, otherwise create one from the Default Offer. The Reference Service may also return a link to a streaming sample of the content.

5. Consumer Acquires the Consumer Player

The consumer with a personal computer, for example, a Wintel PC may acquire the Consumer Player and the accompanying Rights Management System (RMS) by downloading the software through the Internet or by uploading the software from a physical disk such as CD or DVD. The Consumer Player and the RMS may be distributed jointly, with the RMS embedded in the Consumer Player. Alternatively, there may be separate distribution of Consumer Players and the RMS. The consumer is required to register the RMS before being able to consume the system-protected content. The consumer is also required to register the Consumer Player and set up one or more accounts for the purposes of payment and tracking. Alternatively, Consumer Player registration may be optional so that a consumer may use select features that do not involve purchasing.

To acquire the Consumer Player through the Internet, the consumer requests the download of the software at the Retail Web Site which forwards the request to the Registration Manager to perform the download. Alternatively, the Consumer Player will be downloadable from any suitable web site. Independent of the Consumer Player, the Rights Management System may be downloaded from any suitable web site. For example, the user without a Consumer Player may see a song icon (referred to as a Content Reference) on a web site and if they click on it, the consumer is asked if they would like the Consumer Player downloaded. The content reference may specify which of the various versions of the Consumer Player to download where there is a preferred player for the owner of this song. The content reference contains information on how to find content objects. In the example above, the primary function of the content reference is to describe and find a song for the consumer, but there is a conditional function to assist in downloading the Consumer Player.

Alternatively, the Consumer Player and/or the RMS may be obtained on a CD, DVD or from some other physical media. The consumer installs the Consumer Player and/or RMS in the conventional manner.

The Consumer Player and the included Rights Management System (RMS) may come with self-installing software and the typical consumer has the necessary infrastructure to install the Consumer Player and the RMS. Once the software is installed, the consumer sends a request to the Registration Manager to register the RMS. Each registration of an RMS typically requires a cryptographic session to be undertaken, involving a number of functional transactions required to enable the RMS. There may be only one Registration Manager. Alternatively, there may be multiple Registration Managers, each capable of activating RMS's. All Registration Managers using the same basic technology inter-operate and share information. An RMS is initially activated by the Registration Manager. The Consumer Player typically communicates with the Registration Manager for RMS maintenance, involving periodic cryptographic updates of the RMS to assure the security and integrity of the system.

The Registration Manager sends an acknowledgment to the consumer of the registration of the RMS. The Consumer Player or RMS may be upgraded from time to time as the software is improved. As part of the deployment process outlined above, the consumer may have to be authenticated which involves providing credit card details. Authentication may be combined with the establishment of the financial record, in which case the Registration Manager and the Financial Clearinghouse cooperate in registration of the consumer. For example, should the consumer be rejected for any reason by the Financial Clearinghouse, the RMS might be de-activated by the Registration Manager in response to receiving this information.

To fully utilize the system, the consumer must establish an account with the Financial Clearinghouse. The typical financial account includes the consumer's personal information, credit card number, and a budget established by the Financial Clearinghouse. The extent of financial capabilities available for the consumer, is largely at the consumer's discretion. The more capabilities the consumer wants, the more extensive the scope of the financial account and the more information the consumer must provide. The requirements to establish a financial account may vary by country, e.g., more data might be collected in the US than in the EU. In addition, the content owners (e.g. distributors) may impose some requirements with respect to their content. For example, a distributor may specify in its business rules that only consumers who provided their credit card information will be allowed to exercise its offers. To establish an account, the consumer provides necessary information including for example, personal profile, address, e-mail, payment details, credit card number, requested budgets, etc. The Financial Clearinghouse creates an account profile and sets a budget level for the consumer and sends this information to the Consumer Player along with confirmation of financial arrangements.

If a consumer decides not to set up a financial account, a record is still established in the Financial Clearinghouse where the Consumer Player was registered. This record can later be used to collect audit trail data (e.g., of purchases made through retailers' clearing mechanisms). Setting up the financial account may be incorporated in the Registration Manager registration process. The consumer is prompted "Would you like to establish an account?" and if the answer is no, the Registration Manager messages the Financial Clearinghouse to set up a record of registration without a financial account. The clearing process is typically transparent to the consumers.

5A. The Consumer Player

The Consumer Player described in this document may be part of the system and reside on a PC host using the Windows Operating System. The design is such that the Macintosh system may also be supported. This design attempts to leverage the resources of the PC host to provide an enhanced experience for the consumer when consuming and paying for content delivered to them over the Internet or via another delivery system.

The Consumer Player is designed to provide this enhanced experience. The Consumer Player can play a comprehensive set of media types in combination and sequence to provide the consumer with the experience intended by the content creator. The Consumer Player offers enhanced quality Audio from that usually found on the Internet, including the option of 6 channel audio. The Consumer Player provides a point of organization and storage for the content of the consumer. The Consumer Player provides a dedicated fast and accurate content search mechanism for audio and media content. Although the Consumer Player may be implemented on other platforms, specifically set top boxes and Consumer Electronics devices, these hosts may be unable to offer the rich environment of the connected PC and as such a number of the player functions may be restricted or reduced significantly in these environments. The Consumer Player provides a platform for the consumption of content that can be enhanced by the consumers such that their content consumption increases in both qualitative and quantitative terms.

The objective of the Consumer Player is to provide an intuitive and easy-to-use interface stimulating the consumption of music in new and innovative ways. This is supported by an electronic music commerce service in which the content and its associated business rules are delivered in secure containers. The system supports the delivery of music in the secure containers both over communications networks and via optical disc. The Consumer Player supports the consumption of all music that is in the determined system format(s) and for which it has the method for interpreting the associated rights.

The Consumer Player architecture is designed to work with E-commerce solutions, as they become available and is currently intended to work with secure containers. However, the Consumer Player architecture itself is sufficiently abstracted to be capable of working in other secure E-commerce environments based on the principles of trust systems and secure containers.

The Consumer Player performs the complex task of providing the consumer with the interface and mechanism to interact with the system as a whole. Although the Player may be internally complex the interface and consumer experience are intended to be simple and flexible. Player functions can be grouped into the following areas: Content Rendering the audio and other content playback devices; Content Data Management of local and remote content of which the Consumer Player is aware; Commerce Transaction for undertaking electronic commerce with suppliers of the content; Rights Management System for ensuring that the Consumer Player (and consumer) have the ability to acquire the rights and to consume the content according to those rights; and Preferences and Administration for configuring the Consumer Player and the details of consumer participation.

Each of these functions interacts with themselves and the other system elements to provide the service delivery to the consumer. The Consumer Player may be part of a computer environment based on the Windows operating systems, with Windows 95, 98 and NT4.0 being supported, and with an Internet connection. The Consumer Player may also be incorporated in consumer devices or be part of other computer environments. The different implementations of the Consumer Player, for example, more constrained (e.g., an unconnected consumer electronics device) environments, are modified accordingly.

The Consumer Player may be a self contained system providing the facilities for playing music and associated content and data delivered and paid for by an E-commerce system. The Consumer Player may be a stand-alone Wintel PC hosted application though it may be dependent on the supporting infrastructure and e-commerce system. The Consumer Player may additionally support playback of Enhanced CDS.

The Consumer Player may be able to view, play or execute multiple types of content, following the associated rules, from within the secure containers and by parsing Digital Content Description Language (DCDL) files, from Enhanced CDS. The Player will also be able to provide similar functionalities for traditional CDS. Currently, Windows, Macintosh and Unix OS platforms use a hash function to predict, often with a fair degree of accuracy, what CD is in the currently selected drive. This method is how the OS audio Consumer Player "remembers" the names entered in the provided name fields. The Consumer Player adds a local form of DCDL which is kept on the consumer's hard drive (updated over the Internet or from CDS) and this will be used to add enhanced function to red book discs. The Consumer Player may support a range of content types covering the mainstream MIME delivery types.

The Consumer Player may be able to play and manipulate content playback in line with both the rules determined by the distributor (e.g. the sequence in which an Artist wishes songs to be played on an Album) and the desires of the consumer (e.g. Play tracks 2, 9, 11, etc.). The consumer may be able to store, retrieve and manipulate these "Play lists." In addition the Player provides the consumer with the ability to Associate content, events, web locations, email or any other MIME type with a Content Object and store, retrieve and manipulate these as they wish. The Consumer Player may be able to initiate, respond to and synchronize Online activities and combine the Playlists, Associations and Synchronizations to extend the experience of content consumption.

As the Consumer Player preferably supports a wide range of incorporated technologies and evolving standards, each of the Player modules provides an abstraction layer to support multiple instances of the services and the components whilst providing for each of these components to iterate individually. To achieve this the Player may include one or more of the following fundamental modules: the Content Access module which transacts with the E-commerce Rights Management System to enable the consumer to access the content in line with their rights; the Commercial Transactions module which interfaces to the E-commerce system to undertake the financial transactions to obtain the rights to access the content; the Content Players module which allows the content to be viewed or played as determined by the Content Access module; the Graphic User Interfaces (GUI) for all the modules and consumer interface modules; and the Event Scheduler module which is the application control logic that operates the Consumer Player.

The Content Player module controls the content players responsible for the rendition of the content. The Content Player may be implemented in such a way as to ensure that access to the content being played through them is of sufficient security that the consumer cannot copy the material to an unauthorized (by the content's rights) area, such as their hard disk or removable media.

The Consumer Player may be adapted to provide a basic level of security such that the consumer cannot copy, capture or redirect the content to an unauthorized device. This involves the disabling or deletion of functions such as Save, Print, Copy, Paste etc. The Content Access module may also require the reinstatement of these functions in particular circumstances such as when the consumer has paid for the right to print or make a copy to an approved medium.

With the Rights Management System, and potentially other models, the players may need to undergo a certification process to establish that they do not weaken the overall security of the deployed e-commerce system. The players may preferably comply with different copy management standards. The Consumer Player modules may be supported by a common set of foundation services in the form of a secure memory area, multi threaded controller(s) and time-base synchronizers. The Consumer Player controller may use a secure buffer space in which to unload the contents of the secure containers prior to undertaking a synchronized playing of multiple media as determined by the Rendition Object and managed by the Player Event controller. The secure memory space may use a method of obfuscating the data such that, while any potentially hostile consumer may be able to take "memory snapshots," they would find it extremely difficult to reconstruct the content. The memory space may be dynamically assigned, with the total assigned memory, or memories, being less than that required to hold a full Content Element.

The Content Access module is designed to provide a layer of abstraction between the Consumer Player and the Rights Management System (RMS's) that provide access to the secured content. The Requests and commands of the Event Scheduler may be passed to the Content Access Module, which then pass them to the relevant RMS sub-system. The requests to undertake an action may be validated by the specific RMS for the requested Content Object and those activities permitted by the rights may be undertaken, such as requesting content to play or requesting Content for copying. The Content Access module may also act to enforce the selections of the consumer within the copy management windows, especially between formats.

CSS is a media protection format that is likely to be deployed across the range of media types that the Consumer Player encounters. Currently CSS is a hardware-only solution that may be accessed through device interface drivers or a secure serial link such as IEEE 1394. The Commerce Transaction Module aims to support the operation of a number of potential rights management systems and their interactions with finance clearing houses. The commerce transaction module may also act to support the GUI for the set up and deployment of the Consumer Player.

The initial deployment of a RMS may require that the host and the consumer identify and validate themselves to the deployment authority. The consumer acts through the GUI's and dialogs supported by the Commerce Transaction Manager to register the rights management system such that transactions may then take place. This information may include credit card or other payment details, identity, etc. which will be held within the RMS secure protected database. The initialization process should include some mandatory and some optional information elements to allow consumers to individualize their e-commerce environment. The Commerce Transaction Module is preferably transparent to the commands and requests made of the RMS systems. These commerce transactions are undertaken through the Consumer Player Transact/Budget GUI. The Commerce Transaction Module supports the consumers' transaction processes and provides the details required to be handled by the Financial Clearinghouse. This module supports both synchronous and asynchronous transactions, dependent on the type and requirements of the clearinghouse and the type of transaction to be undertaken (contract or deferred).

The Event scheduler and application logic are the core of the Consumer Player and determine the operation of the functions described in the functional description of the Consumer Player. The controller may be a multi-threaded event scheduler, which interprets the commands and undertake the appropriate actions. The Event Scheduler and Controller may include Queue management and the real time synchronization of the actions of the Consumer Player.

The Event Scheduler manages the local non-secure data stores that contain the Customer, Content Object, Association and any other databases that the Player requires to operate. The databases themselves may be non-secure, though the content objects and associated objects they contain may not allow consumer access. Those elements of the databases, which enable the consumer to manage their content, such as associations and Edit Decision Lists may be accessible through the relevant consumer interfaces.

The GUI model involves two elements, the GUIs themselves and the abstraction layer to support the operation of those GUI's. The GUI support layer validates the GUI information sets and handle errors and exceptions that are generated by the consumer in inputting data to the selected GUI. The GUI may preferably provide all the required functionality of the Consumer Player in an accessible and intuitive interface.

The Consumer Player may provide an integrated GUI approach, though it may call the relevant Browse, E-mail and other third party applications, which maintain their own presentation. The three main screens are the Default Controller screen and the Expanded Controller screen and the Graphics Controller Screen, which provide access to most of the Consumer Player control functions. The Browse screen provides access to the management and searching capabilities within the Consumer Player. As the Consumer Player is an element of the system, the GUI provides support for all the interfaces and interactions with the other system elements.

6. Consumer Exercises an Offer for Content

After the consumer acquires content from the Production System and it resides locally, the consumer may proceed to exercise the offer associated with the content by using the Consumer Player. The Consumer Player provides a user interface that presents to the consumer the various options such as play music, display lyrics, copy music, etc. The consumer, for example, chooses to play the music which activates the Rights Management System (RMS) on the Consumer Player. The RMS processes the consumer requests by determining the cost of the consumer's request based on the request and the acquired rights for the content. In addition, the RMS facilitates the financial transaction in cooperation with the Financial Clearinghouse. The RMS displays payment options (e.g., contract or deferred) and the consumer selects one.

Figure 11:
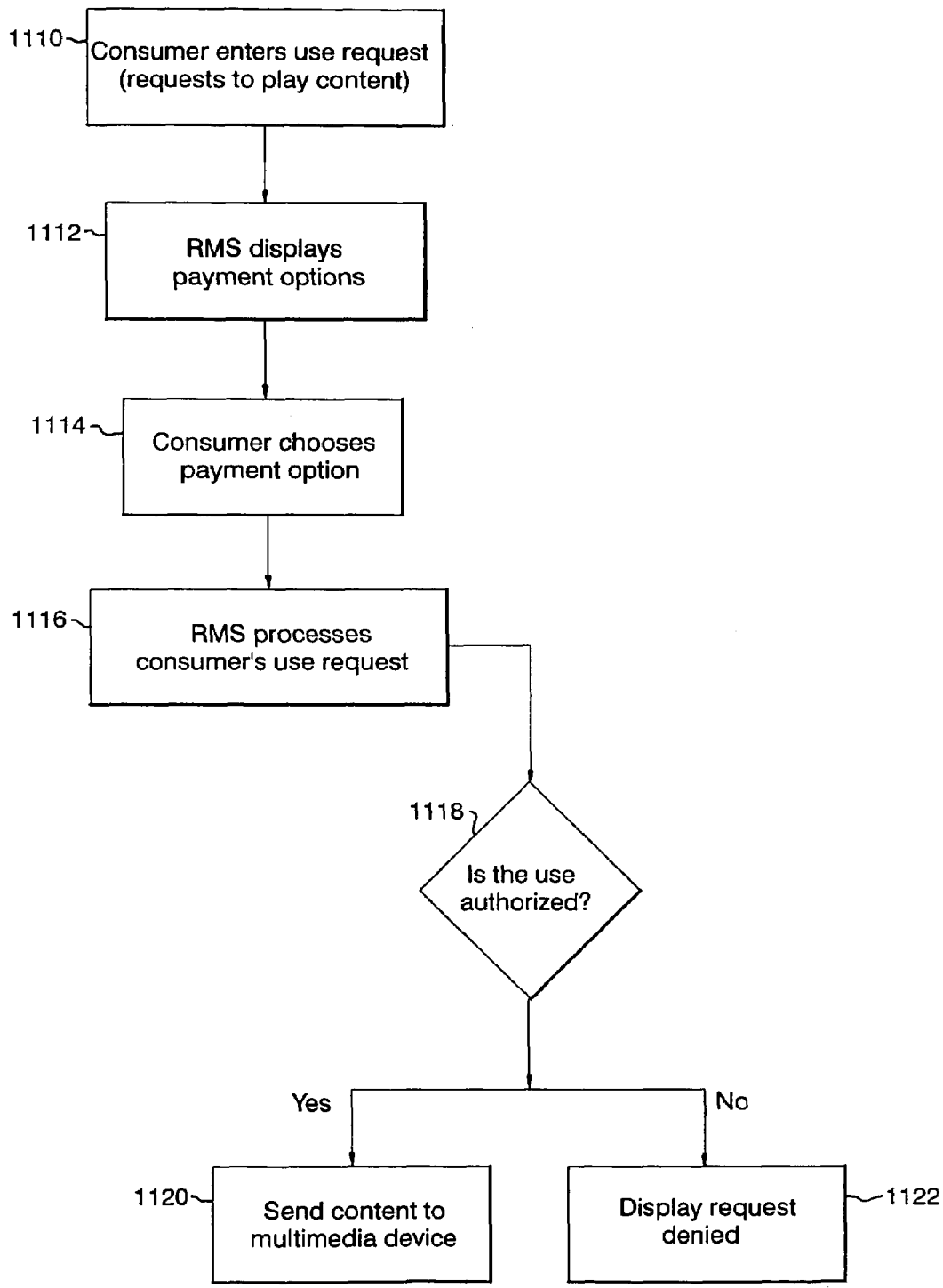
FIG. 11 is a flow chart showing a method for exercising an offer for content in accordance with the preferred embodiment.

Referring to FIG. 11, for the consumer to exercise an offer, the consumer requests to play the content (step 1110). The RMS displays the payment options (step 1112) and the consumer then chooses a payment option (step 1114). The RMS then processes the consumer's request to use or play the music (step 1116). The RMS determines whether the use request is authorized (step 1118). Provided the use is authorized, the RMS sends the content to the playback or multi-media device the consumer wishes to use (step 1120). If the use is not authorized, the RMS displays to the consumer that the use request is denied (step 1122).

Figure 12:
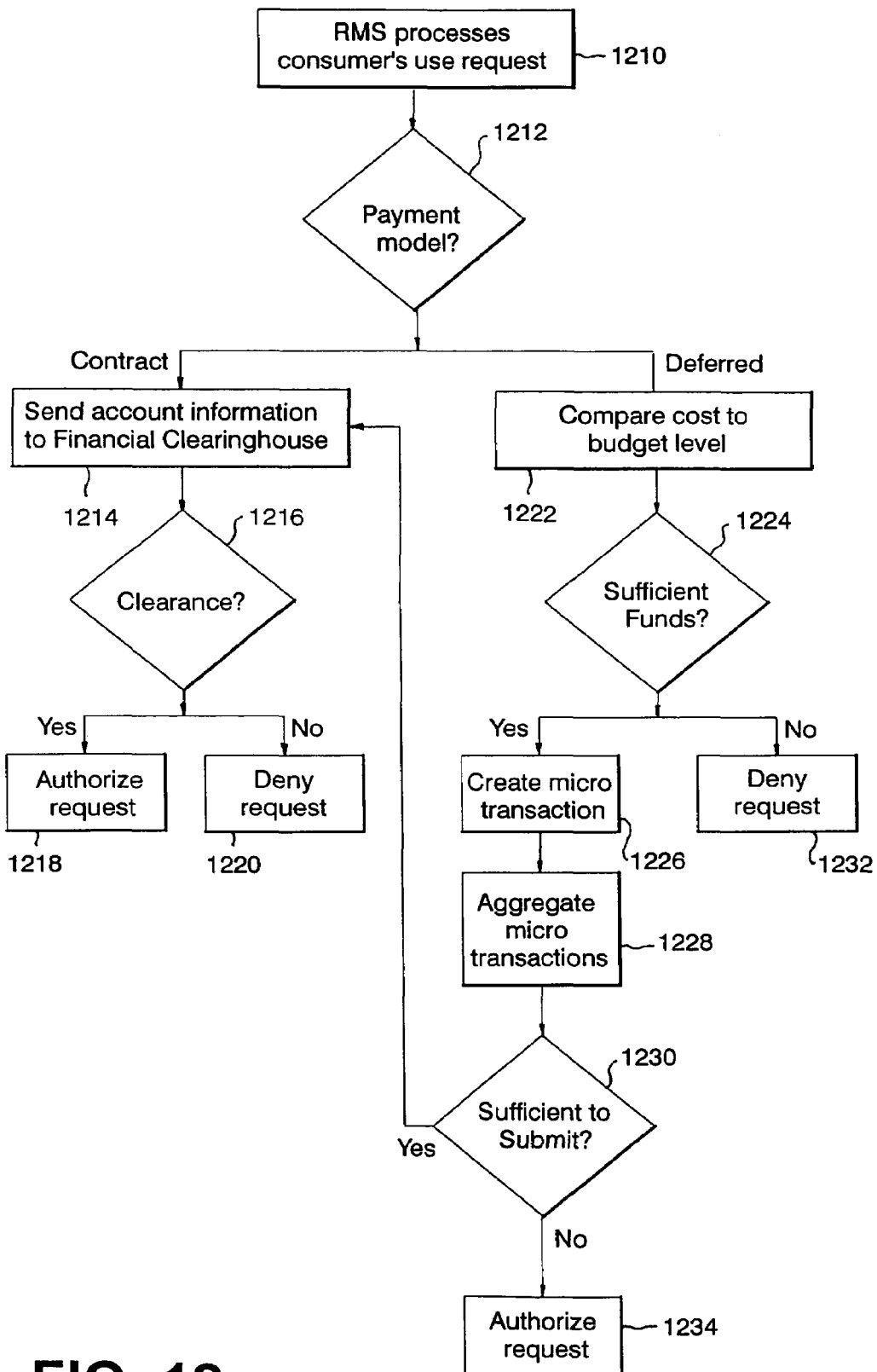
FIG. 12 is a flow chart showing a method for processing a request to use content in accordance with the preferred embodiment.

Referring to FIG. 12, the RMS processes the consumer's use request, for example to play the music (step 1210). If the consumer selected the contract model for payment (determined at step 1212), the RMS sends account information to the Financial Clearinghouse (step 1214) which processes the transaction (cost of the content use request) immediately. If the transaction is complete, the Financial Clearinghouse returns clearance to the RMS (step 1216) and the content use request is authorized (step 1218); otherwise the content use request is denied (step 1220). If the consumer instead chooses the deferred payment model (determined at step 1212), the RMS compares the cost of the use request to the consumer's remaining budget level (step 1222). If there is sufficient funds (determined at step 1224), the RMS adjusts the remaining budget level and creates a micro transaction (step 1226) which is added to the consumer's past micro transactions (step 1228). When the aggregate of transactions exceeds a certain threshold, e.g., number, dollar amount, etc. (step 1230), the aggregated transactions are sent to the Financial Clearinghouse for clearance (step 1214). Otherwise the RMS authorizes the use request (step 1234). If there are insufficient funds, the request is denied, i.e. not authorized (step 1232).

Figure 13:
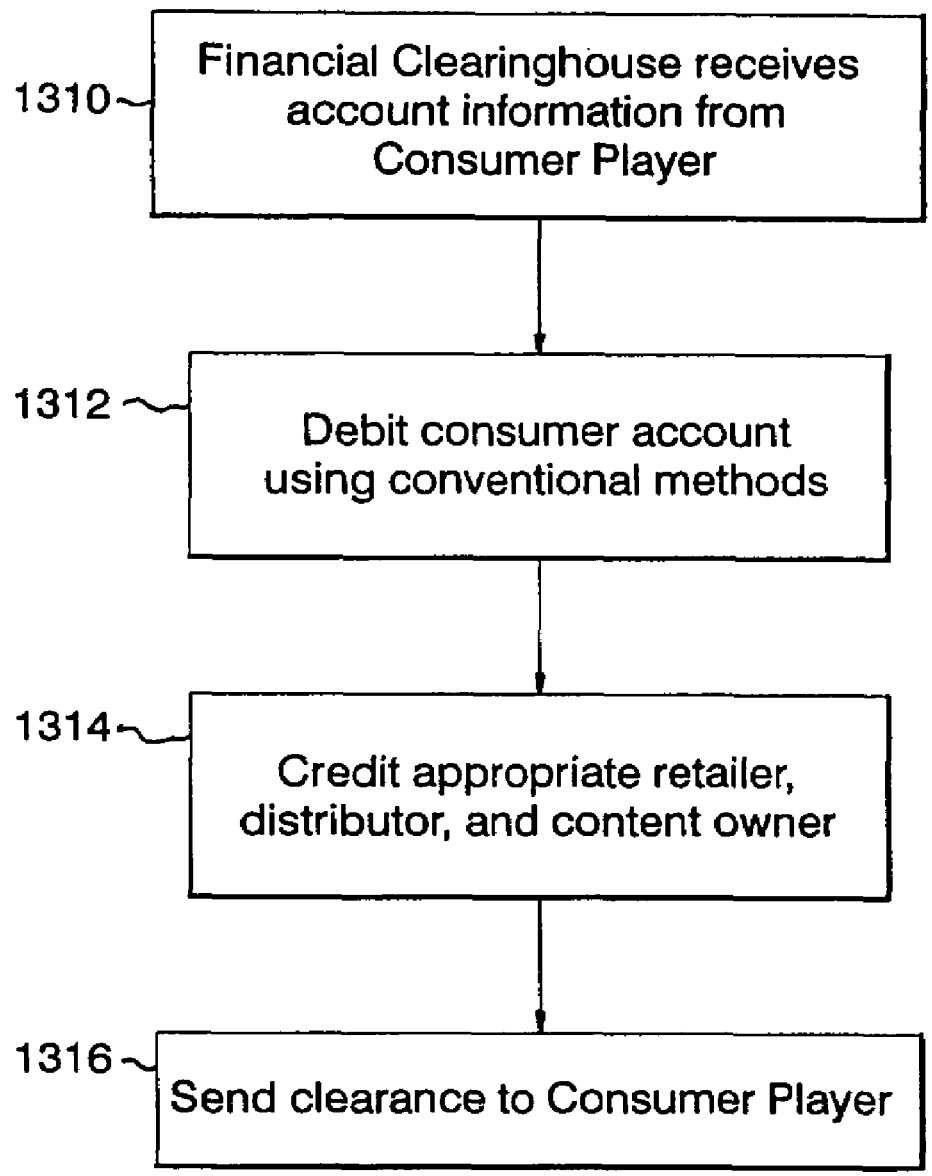
FIG. 13 is a flow chart showing a method for processing a financial transaction in accordance with the preferred embodiment.

Referring to FIG. 13, the Financial Clearinghouse receives account information from the consumer interfacing with the Consumer Player (step 1310). The Rights Management System of the Consumer Player calculates the cost independently or in conjunction with the Financial Clearinghouse. The Financial Clearinghouse sends the information to the consumer's credit card account using conventional methods (step 1312). The Financial Clearinghouse also credits the retailer's account and the distributor and any other content owners as is appropriate for the given transaction (step 1314). Upon successful completion of the transaction, the Clearinghouse sends clearance to the Consumer Player to proceed with the use of the content as the consumer requested (step 1316).

The Consumer may choose to exercise an offer for which the content is available locally. In this situation, the Consumer Player displays the rules for exercising the content (e.g., "$10 to purchase outright or $1 to listen once"). The rules might be modified by the consumer's attributes (e.g., consumer belongs to a club X and the rules specify that "members of club X can purchase for $9"). The Consumer chooses one acquisition option and the Consumer player checks the conditions by comparing the acquisition rules against the Consumer's financial status. For example, the Consumer player checks that there is a sufficient budget available to perform the transaction. Provided the Consumer has a sufficient budget, the Consumer acquires the rights. Then, the Consumer is allowed to play the music or display graphics, etc. in accordance with the acquired rights. The acquired rights are included in the transaction database created and stored locally by the Consumer. Additionally, for each use of the content, a transaction record is created and included in the database indicating the use. At a later date, the transaction record is aggregated with other transaction records and reported to the Financial Clearinghouse.

In the event that the consumer selects an offer that has expired, the consumer will be offered a choice of valid offers. Selecting an expired offer may arise when the consume clicks on a locally stored reference describing a timed-out offer to a previously downloaded content. When the Consumer Player in conjunction with the RMS checks the offer, it is then determined that the offer has expired. The consumer is then offered a choice to use the content's Default Offer or attempt to find another offer from the same retailer. If the consumer chooses the Default offer, the content is purchased with the Default Offer. If the consumer chooses to find a substitute, the Consumer Player messages the Reference Service which finds a substitute offer from the same retailer. In either case, the Consumer receives a valid offer.

Retailers or distributors may revoke an offer in the event that revocation is necessary for business reasons or otherwise. The retailer or distributor may revoke an individual offer from a specific retailer, or all offers from a specific retailer. Subsequently, when the consumer attempts to exercise such an offer, they are informed that the offer is not valid and are provided with an alternative offer.

The distributor's Reference Service and appropriate clearinghouses are notified of the revocation of the offer, causing a message from the Reference Service to be broadcast to all the consumers. If the consumer does not have the content, the Consumer Player contacts the Reference Service with a request to download. If the consumer has the content and is presently connected, the Consumer Player contacts the Reference Service with a request to validate. In either case, the Reference Service determines that the offer has been revoked and proposes an alternate offer. If the consumer has the content and is not presently connected, the consumer is allowed to exercise previously acquired rights and the conflict is resolved later during clearing.

For select content, the Default Rights allow the consumer to copy the acquired content from the Consumer Player to another medium. This subject medium may be a Consumer Electronics Device, a Consumer Electronics Portable Media (e.g., Flash-RAM) or a DVD-RAM. When the consumer chooses to exercise the right to copy, the consumer is limited to the copying rules specified in the default rights and the rights acquired for that content. The consumer uses the Consumer Player to assist in copying the content. When the consumer copies the content onto, for example, Consumer Electronics Portable Media, the Consumer Player assists in converting the content to an appropriate format for the Consumer Electronics Device. The resulting content can then be played on a Consumer Electronics Hardware Player. The Consumer Player in conjunction with the RMS will not allow the consumer to make more copies than the rules allow.

In addition to obtaining content directly over the Internet, content may be obtained on physical disc. In this case, the consumer receives a replicated disc with the content in system-compatible format and the consumer may transact with the system to acquire the rights to use this content. When the Consumer Player plays the content, the content rights are negotiated with the RMS in the Consumer Player. Knowing it as a replicated disc, the Consumer Player negotiates the rights with the RMS in the Financial Clearinghouse. If the consumer is already an account holder, the rights are established directly, and payments are effected. If the consumer is new to the system, the Financial Clearinghouse establishes an account, registers the consumer and establishes RMS for the content on the disc (as described above). The RMS allows the music to be played if sufficient budget is available.

7. Purchase Content from Retail Web Site

When the Consumer chooses a song, they are presented with three options: "Sample," "Buy now," "Download and buy later." When the consumer presses "Sample," the Retail Web Site produces a sample of the music. The samples may be prepared by the Retailer or by the Production System or provided by the distributor or some other source.

When consumer presses "Buy now," the contract offer ("C-Offer") is downloaded, as discussed below. When the consumer presses "Download and buy later" option, the deferred payment model offer is downloaded. In this case, the consumer downloads the content with one or more offers or without any offer by interacting with the Retail Web Site in a manner similar to the C-Offer process. However, the actual purchase is performed at a later time upon selection of a particular offer by the consumer while interacting with the Consumer Player. In processing a "download and buy later" option, the Consumer Player facilitates the purchase and then reports the transaction to the Financial Clearinghouse to settle the accounts in a manner similar to the C-Offer process.

When the Consumer browses a Retail Web Site, they may find reference to a content of interest, find an offer for the content, or download the offer requiring contract payment to the retailer. The actual presentation to the consumer of the content, the offer, the purchasing options (e.g., "pay now" or "pay later") is at the retailer's discretion. Once the consumer has the C-offer downloaded, the Consumer Player application is invoked in the background, but the consumer continues to interact with the system through the browser. The Consumer Player checks that the offer is valid and that the consumer had not acquired rights to the content earlier. If the offer is not valid, consumer can select to find an alternative offer that is valid. The Consumer Player may also check at this point whether the content is available locally.

The C-Offer can not be exercised by the consumer directly—it requires "personalization" by an outside party. Personalization means that the acquired rights are being "tied" to a specific player or RMS or account. It is not required that the C-Offer have transactional information, rather the C-offer includes the list of rights being acquired. In order to be processed by the Financial Clearinghouse, this C-Offer should include transactional information in addition to listing the rights being acquired. Thus, the actual price paid and payment details will be known to the system. The actual step of downloading the C-offer can be performed later, after the consumer has checked out (paid for) the content. This may allow personalizing the offer in one step. However, downloading C-offer prior to payment has the advantage of protecting consumers against paying for invalid offers.

In order to process a C-Offer, the Consumer Player contacts the Financial Clearinghouse. The consumer is then presented with the price and payment options where the price and the rights options are derived from the C-Offer. Additional payment information may be supplied by the Financial Clearinghouse. The Financial Clearinghouse also obtains the payment details from the consumer, such as credit card details. To reduce consumer care problems, the Financial Clearinghouse is advised to not charge the consumer's credit card until after it receives acknowledgment that the content has been successfully delivered. After successful payment processing, the Financial Clearinghouse provides payment acknowledgment to the consumer. The consumer's RMS then generates a record of acquired rights in the protected rights database, as well as a record of the transaction.

When the consumer requests to download the content, the Consumer Player first checks to see if the content is locally available, i.e. it has been downloaded before. If the content is not available locally, the consumer is offered the option of downloading the content right away. The consumer may choose to do so, or alternatively, the download can be scheduled for a future time. If the consumer chooses to download the content, the Consumer Player contacts the Reference Service of the content's owner and requests the content. The Consumer Player notifies the Reference Service that it has acquired or plans to acquire the rights to the content. The Reference Service verifies that the request is legitimate and provides the Delivery Service address to the Consumer Player to proceed with the content delivery. The Consumer Player contacts the Delivery Service and commences the download process. The download can be interrupted at any time and continued at a later point in time. After a successful download is completed, the Consumer Player informs the retailer and the Financial Clearinghouse, and the Financial Clearinghouse then provides payment-acknowledgment to the consumer. The payment-acknowledgment will be securely generated using Clearinghouse Tools and will be used to personalize the C-Offer. The acknowledgment states the exact rights that were acquired by the consumer. The consumer's RMS generates a record of the acquired rights in the protected rights database and a record of the transaction in the player's budget management module. The Financial Clearinghouse bills the consumer's credit card (or other payment mechanism) and settles with the retailer and the content owner (e.g. distributor).

7A. Consumer Transactions Reported to the Financial Clearinghouse

Based on certain parameters, such as budget threshold, time period, offer condition, clearinghouse request, etc., the consumer's RMS reports accumulated transactions to the Financial Clearinghouse. The reported transactions include the deferred payments made against the RMS budget and transactions cleared immediately (e.g., through retailers' web sites) and not charged against the budget. Deferred transactions are reported and payments are made to the value chain participants (retailers, distributors).

When the Consumer acquires rights to the content, the rights are stored in the Consumer Player's Protected Database which is protected by the RMS. If a transaction is deferred, the appropriate local account budget is debited. The record of the transaction is created and stored in the e-commerce module (for both deferred and contract transactions). The Consumer Player may be able to record other information about the consumer's behavior (e.g., how often a song's been played) subject to the consumer's permission and report this data to the Information Clearinghouse.

The Consumer Player contacts the Financial Clearinghouse when it is triggered by certain events, for example, the occurrence of a scheduled "report-back" time (e.g., the $12^{th}$ of every month at 4 am local time), the budget threshold has been reached (e.g., the player is required to report-back when 75% of the preset budget has been used up), or the consumer is attempting to exercise an offer whose business rules specify an immediate report-back (e.g., for large purchases). The Consumer Player sends out the report-back request to the Financial Clearinghouse which responds by establishing a communication session. Where there are multiple clearinghouses, the Consumer Player contacts the Financial Clearinghouse as determined during the registration process. The only case where the Consumer Player contacts a different clearinghouse is when a consumer is attempting to exercise an offer whose business rules specify an immediate report-back to a different clearinghouse (in this case probably only that one transaction will be reported for clearing). If communication cannot be established (because, for example, the Consumer Player is not online), the Consumer Player will re-try according to a specified algorithm (e.g., when next connected).

Once a communication session is established, the Consumer Player sends transaction records to the Financial Clearinghouse which processes the transaction records and applies them to the appropriate account(s). The transaction records are archived in the Financial Clearinghouse for audit purposes. Additionally, the Financial Clearinghouse essentially recreates the consumer's Protected Database for consumer care purposes. The Financial Clearinghouse sends a command to the consumer to mark these transaction records as reported and (if appropriate) to reset the local budget(s). The Consumer Player archives records of the reported transactions for a period of time. After this period (which can be preset or determined by available storage resources) the records are purged. The Financial Clearinghouse requests and obtains payment from the appropriate Transaction Manager (e.g., VISA—if the consumer's account is funded by a VISA credit card). The Financial Clearinghouse aggregates (across multiple consumers) and distributes funds to content owners and retailers. The distribution is calculated per stored (in the clearinghouse) compensation arrangements.

8. Duplicate Modules

The various modules work in concert to realize the system of the present invention. Many of the modules may be duplicated, for example, to handle increased volume of transactions. For example, the system may operate on multiple Retail Web Sites where some Retail Web Sites are affiliates of one or more full featured Retail Web Sites. Furthermore, each full featured Retail Web Site may have its own associated Registration Manager and/or financial clearinghouse. The system may have multiple Registration Managers where each Registration Manager is directly associated with a particular retailer. The system may maintain multiple Production Systems working in parallel and carefully synchronized.

There may be multiple Financial Clearinghouses, allowing retailers to choose which clearinghouse to use. The clearing process will be transparent to the retailers—each retailer will only have to have an account with its "home" Clearinghouse and all the Clearinghouses will inter-operate as described below. It is possible for retailers to have accounts with different clearinghouses.

To illustrate system operation with multiple clearinghouses, consider a situation where Consumer A exercised an offer from full-featured Retailer B which contained content from Distributor C and Distributor D. Consumer A has an account with Clearinghouse 1, Retailer B has an account with Clearinghouse 2, Distributors C and D have accounts with Clearinghouses 3 and 4 respectively. Clearinghouse 3 knows the commercial arrangement between B and C, Clearinghouse 4 knows the commercial arrangement between B and D, and Clearinghouse 2 knows both of these commercial arrangements, i.e. between B and C and between B and D. It is assumed that through the synchronization process all system-compliant clearinghouses know "home" clearinghouses for distributors and retailers. For example, Clearinghouse 1 has a table indicating that Retailer B is served by Clearinghouse 2, Distributor C by Clearinghouse 3, Distributor D by Clearinghouse 4. Another implementation is that the identification number of the home clearinghouse is included in the offers or synchronization process so that as the offer passes the various modules, the modules are informed of the corresponding clearinghouse. The transaction is reported to the Clearinghouse 1, which is responsible for charging Consumer A and forwarding the transaction information to Clearinghouses 2, 3 and 4. Clearinghouse 2 pays the Retailer B, Clearinghouse 3 pays the Distributor C, Clearinghouse 4 pays the Distributor D. At a later point Clearinghouses 2, 3 and 4 may perform an aggregated reconciliation of some sort.

Selection of the "home" clearinghouse can be performed in a number of ways. One possibility is that the Notification Set carries an address of the suggested clearinghouse. The retailer should be able to overwrite any selection and establish an account with a compliant clearinghouse of the retailer's choosing. The retailer provides necessary information for account establishment (profile, address, e-mail, clearing bank, content owner, etc.). The retailer can have accounts with multiple clearinghouses. All of these options can be available as dictated by the specific implementation of the system.

9. Protocols—Module Interfaces

Figure 14:
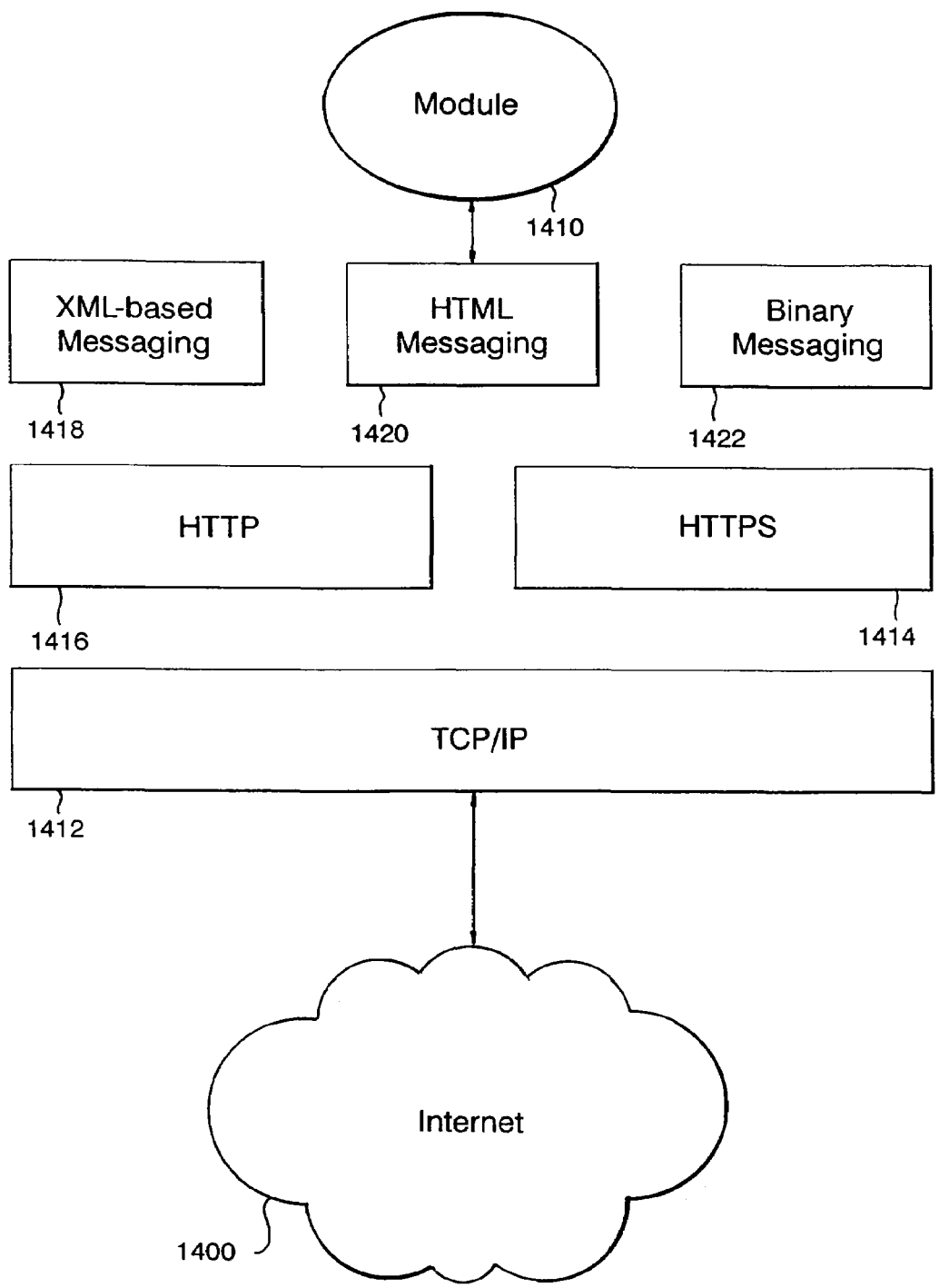
FIG. 14 is a block diagram of an arrangement of protocols used in accordance with the preferred embodiment.

The modules communicate over a distributed network, e.g. the Internet, using standard protocols. Referring to FIG. 14, the modules (1410) interface using Transmission Control Protocol/Internet Protocol (TCP/IP) (1412) as the underlying protocol. Hypertext Transfer Protocol Secure (HTTPS) (1414) is used where security is important. Hypertext Transfer Protocol (HTTP) (1416) is used for the remaining interfaces. On top of the HTTP/HTTPS layer, there are several choices for messaging: Extensible Markup Language (XML) (1418), Hypertext Markup Language (HTML) (1420), and Binary (1422).

The application-layer protocols may use XML to define messages to provide inter-module communications. Communications between modules may be in the form of a request/response message pair. This will utilize the underlying HTTP POST message request and response. Using the HTTP POST mechanism, a client module makes a request to a server module. HTTP provides appropriate header information to address the message appropriately and specify that this is a POST request and that the payload is an XML document. The server module uses standard software to perform the basic protocol handshaking to receive the message and interpret the HTTP header information. The server handles the request and responds with the HTTP POST response message. These request/response protocols work in an analogous fashion to an HTML interaction between web browsers and web servers.

XML is a very simple language designed to specify information. It is based on Standard Generalized Markup Language (SGML) and allows data objects and messages to be formatted in a flexible and easily parsable manner. As an example, a simple song object might contain the song title, artist, producer, year of release, genre and recording label. This could be encoded in XML as follows:

```
<song version ="1">
    <title>You're Still the One</title>
    <artist>Shania Twain</artist>
    <producer>Mutt Lange</producer>
    <year>1998</year>
    <genre>country</genre>
    <genre>pop</genre>
    <recording-label>Polygram</recording-label>
</song>
```

The above example shows a song object. The song is enclosed in a start tag (i.e. <song>) and end tag (i.e. </song>). Nested start and end tags specify the components of a song. Tags can be nested to any depth to handle more complex objects. Also, tags may be repeated to specify lists (e.g. genre). Also, shown is an attribute to the song tag specifying the version of the song object. This version could be used to future proof song objects so that if a song object changes in a dramatic way a few years from now, the version can be used for software to simultaneously handle new and old song objects. Some tags or attributes may be optional. If so, then they can be simply left out of the song object. Conventional tools such as parsers and editors exist which can be used in the development of XML-based applications.

Modules may store objects internally in whatever format is considered to be most appropriate. However, the data objects that pass between modules should be in a well-defined format. Preferably, XML is used as the basis for these formats.

The following is an example of the structure of a Request Message. This example is an "AddSong" request message sent from the Production System to the Content Catalog to publish a new song.

```
<?xml version="1.0">
<emd-message message-id="1"
    timestamp="1999-feb-23T07:30:30"
    emd-version="1.0"
    from="PS"
    to="CC"
    transaction-type="single"
    type="request">
<emd-cc-request type="AddSong">
<song title="You're Still the One"
    artist="Shania Twain">
</song>
</emd-cc-request>
</emd-message>
```

The following is an example of the structure of a Response Message. In the example, this message is in response to the "AddSong" request message above.

```
<?xml version="1.0">
<emd-message message-id="1"
    timestamp="1999-feb-23T07:30:50"
    emd-version="1.0"
    from="Content Catalog"
    to="Production System"
    transaction-type="single"
    type="response">
<emd-cc-response type="AddSong" status="OK"/>
</emd-message>
```

Similarly, HTML Messaging may use standard World Wide Web technology.

Messages are not limited to textual based data. The musical content (in secure containers) and the images, for example, are stored as binary data and the XML protocol used to encode content references does not natively handle binary data. Since the binary data needs to be transported with the content references, in the preferred method, the binary data is appended at the end of the XML document containing the encoded content reference. In this way the reference is completely self-contained making drag and drop operations simpler to implement. However there are alternative methods, such as, using a single XML document with binary data embedded or with URL pointer to the binary data.

10. The Content References

The system transports electronic digital media to consumers in a timely and efficient manner. Electronic digital media content such as music are referred to generically as content. The nature of content is that they are large objects, typically multiple megabytes in size. Their transport requires a balance of bandwidth and time to get it to consumers. In addition, storage of content requires significant resources if it is to be kept by the consumer. The solution to this challenge is to separate descriptive information from the content itself. This is analogous to a World Wide Web Uniform Resource Locator (URL). The URL is a small amount of descriptive information that can be displayed on a web page or easily moved around or e-mailed from one consumer to another. The resource, which the URL points to, may be an HTML web page or a large file. These may be large and bulky to move around, but the URL can be remembered and used as a simple mechanism to get to the resource when needed. The System introduces the content reference as the analogous mechanism to avoid copying large content files any more than necessary.

Content references provide a lightweight mechanism used by consumers to receive, save, and share content identification information and to send it to other consumers without having to move large binary files around. A content reference can be thought of as an address or pointer to content and is the mechanism to refer to content indirectly. A content reference contains a small amount of descriptive information about a piece of content. This descriptive information contains sufficient information to allow a consumer with a Consumer Player to determine what the content is and how to get to the content, but does not contain the actual content.

As an example, a fan club web site may include content references to songs for a particular artist without having to store large, unsecured content of that artist. Visitors to the web site will then download the content reference and through the Reference Server they will be directed to a Delivery Service from which they can download the content. That same consumer can also email the content reference to friends or place it on their web site for further dissemination of the content reference. Content references also provide a mechanism for consumers to share a music-listening experience synchronously and remotely. When a consumer is listening to music and wishes to share the experience with another consumer at a remote location he can drag a content reference into an email or chat client and send it to the other consumer. When the content reference arrives at the remote location the content reference can be opened, and using the time synchronization, the Consumer Player is able to start playing the referenced content at the same point the original user's content is playing.

Extensible Markup Language (XML) may be used for representing content references. XML provides a standardized method for structuring data in a loose fashion, allowing flexibility in defining the structure while constraining the content.

Content references take the form of a message that is used system wide for inter-module communication. Each message contains at least a header section and an ID section and may contain additional sections, such as, an offer section, a synchronization section, a debug section and a support section (reserved for future use). For a content reference, the message must contain a meta-data section.

The following XML document is an example of a content reference. This content reference has the following sections, namely: a header section (line 1), an ID section (line 11), and a meta-data section, (line 16), in addition to following optional sections: an offer section (line 24) and a time-sync section (line 38). Below is a Document Type Definition for the XML document as described by the XML version 1.0 specification. The numbers in the left-hand column are line numbers that are not part of the document and are included only for reference purposes. Each tag with its set of allowable attributes is defined following the XML document.

```
    <!-- Header Section mandatory -->
1.  <?xml version='1.0'>
2.  <content-reference version="0.1"
3.  signature="012345"
4.  Base_ID="1234567 . . . 64" >
5.
6.    <debug>   <!-- optional section -->
7.      <!-- arbitrary attributes here -->
8.    </debug>
9.  <!-- there can be multiple item sections -->
10. <item>
11.   <id>   <!-- ID Section mandatory -->
12.     DRID="1" CHID="1" OFRID="1"
13.     PRID="1" MDID="1" OBID="1" GRID="1"
14.     INID="1" PLID="1"
15.   <id/>
16.   <desc>  <!-- Description Section- Basic Meta Data mandatory -->
17.     title="Title"
18.     artist="Artist"
19.     producer="Producer"
20.     publisher="Publisher"
21.     length="HH:MM:SS"
22.   <desc/>
23.
24.   <!-- offer-container section optional -->
25.   <offer-container> locator="inline"
26.     format="VENDOR"
27.     version="1"
28.     encoding="base64"
29.     <sdata>   <!-- secure data section -->
30.       OFRID="234567"
31.       CERT="12345678910"
```

-continued

```
32.          Count="1"
33.        </sdata>
34.      <offer-container>
35.      <support_data>   <!-- support-container section optional -->
36.                       reserved for future use
37.      </support_data>
38.      <time sync>  <!-- time-sync section optional -->
39.         <GTID="1999-02-24T14:30:23"
40.         LTID="HH:MM:SS:MM"<! Offset>
41.         STID="Pause"
42.      <time sync>
43.    </item>
44.  </content-reference>
```

Line 1 is the XML document standard opening that defines the document as a document complying with XML specification version 1.0.

Line 2 begins the content of the content reference. The tag <content-reference> begins the body of the reference. The version attribute takes the format of major#.minor#. The version is incremented by the owner of the content reference specification.

Line 3 is the signature attribute. The signature format is an alphanumeric sequence that may be either a checksum of the reference or a digital signature for validation by another system module. This attribute may need to be a separate section or be included with each section that needs to be protected.

Line 4 is the Base ID which is the random 64 bit number typically assigned to the content reference by the back office system used for indexing. The purpose of this number is to establish the uniqueness of the content reference.

Empty lines such as 5,23, are optional.

Line 6 begins an optional debug section. This section allows for the inclusion of any debug information or commands that developers of the system may require.

Line 7 indicates that debug tags and attributes are placed here.

Line 8 closes the debug section.

Line 9 is an informational comment.

Line 10 begins an individual item section. The item tag for each reference must generally have at least one item section, but may optionally have more than one item section. All item sections must conform to the same syntax requirements.

Line 11 starts the ID section. Each item section must generally have an id clause.

Line 12 contains the value chain ID. The attribute CHID is the Retailer ID and/or Channel ID. It is uniquely assigned to a specific retailer and/or retail channel by the system. The attribute DRID is the Distributor ID. It is uniquely identifies a distributor within the system. The attribute OFRID is the Offer ID and is optional. It is set when the offer is created and is unique to a retailer, channel or distributor. If the CHID is different from the DRID, then the offer was created either by a retailer or channel or the production systems on behalf of that retailer or channel and the offer ID is unique to the CHID. If the offer is a default offer from the distributor (i.e., CHID=DRID) then the offer ID is unique to the DRID. If the Content Reference simply refers to content, there may not be an offer ID.

Line 13 contains the Content ID. The attribute PRID is the Product ID. This is the unique media container in which the content is located. The attribute MDID is the Media ID and is optional. This is the physical media on which the content resides. This can be a CD, ECD or DVD disk or some other physical distribution media. The attribute OBID is the Object ID. It uniquely identifies the digital media object from a specific DRID. This is equivalent to the media object (MOB) described above. The attribute GRID is the Group ID and is optional. It must be included if the object ID is defined as a part of a group and identifies that group (e.g., the content reference is for a single OBID from an Album GRID). It uniquely identifies a group object from a specific DRID. This is equivalent to the group object (GOB) described above.

Line 14 contains the Client ID. The attribute MID is the Instantiator ID. The entity that creates the reference is the instantiator. This can be the distributor, the retailer, or the user. For example, when the user creates a reference by dragging a song from the playlist in the player, they create a reference with the IID set to the user ID. INIDs, CHIDs, and DRIDs are generally distinguishable. The attribute PLID is the Player ID. This is the ID of the player which is assigned by the back office system(s) in a range and/or prefix to enable the Consumer Player to be uniquely identified.

Line 15 ends the ID section.

Line 16 begins the description section. The desc tag and section is the minimum meta data set of the Content.

Line 17 is the attribute title and is the title of the content referenced in the current item section.

Line 18 is the attribute artist. This will be a comma-separated list for multiple artists.

Line 19 is the attribute producer. This will be a comma-separated list for multiple producers.

Line 20 is the attribute publisher.

Line 21 is the attribute length and is the length of the content referenced in the current item section. The format is hours:minutes:seconds (e.g., 16:56:21).

Line 22 ends the description section.

Line 24 is an informational comment.

Line 25 begins the offer container section with the <offer-container> tag. When the reference is simply a reference to content and does not include an offer, then the offer container section will be omitted. The offer ID in the ID section may still be valid. The implication is that the user will need to get the offer from the Reference Service. If the offer is included with the reference, then it can be "attached" in one of three ways. The locator attribute indicates if the offer container is inline, append, or external. These are the three options for the location attribute. If locator=inline then the offer container is base64 encoded and inserted in the following sdata section. If locator=append then the offer container is concatenated to the reference file immediately following the <content-reference> close tag. If locator=external then the offer container is a separate file pointed to by the optional attribute URL. This attribute is not optional if locator="external". In this case, line 21 would read: <offer-container locator="external" URL=file://c:\temp\file.ref.

Line 26 is the format attribute. Allowable values for the format attribute indicate the format of the offer container data. This is dependent on what the vendor used to provide the offer security technology. Therefore, the format will be set to a meaningful value associated with the technology supplied by the security vendor. These values are defined and assigned by the back office system or the production system.

Line 27 is the version attribute which represents the version of the security technology used to enclose the offer. This is vendor-dependent.

Line 28 is the encoding attribute which indicates what technique has been used to encode the offer container data, which will originally be in some binary format, into the same encoding as the reference/XML. Typically the value for encoding is "base64".

Line 29 begins the secure data section with the <sdata> tag. This is the section in which the offer container data is inlined, if locator=inline.

Line 30 is the attribute OFRID which is the Offer ID. It is set when the offer is created by the Production System and is a one way hash function of the Base_ID This is identical to the OFRID in the ID section.

Line 31 is the attribute CERT which is the identity of any certificates or public keys associated with the offer.

Line 32 is the attribute COUNT which is the count field that gets incremented if additional certificates are provided indicating that the offer has been super distributed. This will be used to in managing the super distribution value chain.

Line 33 closes the secure data section with the <sdata> tag.

Line 34 closes the offer container section with the </offer-container> tag.

Line 35 begins the attribute support section. This section contains the support reference data that will be delivered to the client if this section is included.

Line 36 indicates that the support section is reserved for future use.

Line 37 ends the support section.

Line 38 begins the time synchronization section with the <time sync> tag.

Line 39 is the GTID attribute which is a date/time stamp based on ISO 8601 and received from the system time reference server. GTID is set to GMT at creation of the reference.

Line 40 is the LTID attribute which is the offset of the local machine from the start of a piece of Content. This is expressed as hours:minutes:seconds:milliseconds.

Line 41 is the STID attribute which is the condition of the local content expressed as either "play" or "pause".

Line 42 ends the time sync section.

Line 43 closes the item section with the </item> tag.

Line 44 closes the content reference section with the </content-reference> tag.

The invention has been described in connection with a particular embodiment but is defined without limitation by the appended claims and includes insubstantial variations in elements and method steps.

What is claimed is:

1. A method for distributing electronic information using a computer network comprising the steps of:
   receiving from a consumer a request for a selected item of information;
   formulating one or more offers based on predefined upstream business rule parameters wherein the one or more offers are associated with the selected item of information;
   dynamically updating the predefined upstream business rule parameters;
   providing the one or more offers to the consumer based on the dynamically updated upstream business rule parameters;
   receiving a selection of one of the offers from the consumer;
   validating the one or more offers for the selected item of information requested by the consumer, comprising the steps of:
   for at least one offer, referencing an electronic contract between one of a content owner and distributor and a retailer;
   determining whether the offer is consistent with the electronic contract; and
   validating the offer when the offer is consistent with the electronic contract; and
   delivering the requested information to the consumer and enabling the consumer to use the delivered information in accordance with the selected offer.

2. The method as in claim 1, further comprising the step of providing an alternative offer when the offer is determined to be invalid.

3. The method as in claim 1, further comprising the step of providing a default offer when the offer is determined to be invalid.

4. The method as in claim 1, wherein the validating step further comprises the step of generating rights data which determine the one or more offers associated with the information requested.

5. The method as in claim 4, wherein the generating step is performed prior to the delivering step and the rights data is delivered together with the requested information.

6. The method as in claim 4, further comprising the step of providing the rights data to the consumer in a secure format.

7. The method as in claim 4, further comprising the step of dynamically updating the rights data.

8. The method as in claim 1, further comprising the step of executing a financial transaction between the consumer and a retailer related to the use of the requested information.

9. The method as in claim 1, further comprising the step of indicating to a player associated with the consumer that the selected item of information may be rendered according to the consumer's request only when said request is consistent with said selected offer.

10. The method as in claim 1, further comprising the step of verifying the current validity of the previously selected offer at a point in time subsequent to the selection of the offer.

11. The method as in claim 1, further comprising the steps of:
   a. receiving a request from the consumer for additional material about the selected item of information; and
   b. providing additional material about said selected item of information to the consumer.

12. The method as in claim 11, further comprising the step of providing a sample of said selected item of information.

13. The method as in claim 1, further comprising the step of providing payment alternatives about said selected item of information to the consumer.

14. The method as in claim 1, further comprising the steps of:
   a. determining whether the consumer has a player; and
   b. providing the consumer with the player when the consumer does not have the player; and
   c. activating the player for the consumer.

15. The method as in claim 1, wherein the delivering step is performed after the enabling step, at a time designated by the consumer.

16. The method as in claim 1, wherein the delivering step further comprises the step of delivering audio information.

17. The method as in claim 1, wherein the delivering step further comprises the step of delivering graphical information.

18. The method as in claim 1, wherein the delivering step further comprises the step of delivering electronic information in a secure format.

19. The method as in claim 1, further comprising the step of providing the one or more offers to the consumer in a secure format.

20. The method as in claim 1, further comprising the step of monitoring the use by the consumer of the delivered information.

21. The method as in claim 20, wherein the monitoring step further comprises the steps of:
 a. detecting the manner of use of the information previously delivered to the consumer;
 b. determining whether the use is within the scope of the selected offer; and
 c. preventing the use when the use is not within the scope of the selected offer.

22. The method as in claim 21, further comprising the step of tracking the use when the use is within the scope of the selected offer.

23. The method as in claim 22, further comprising the step of effecting a financial transaction according to the tracked use.

24. The method as in claim 23, further comprising the step of effecting a financial transaction according to the selected offer.

25. The method as in claim 1, further comprising the step of providing an offer that allows the consumer to pay an amount for each instance of use of the information.

26. The method as in claim 1, further comprising the step of providing an offer that allows the consumer to pay a fee for unlimited use of the information for a period of time.

27. The method as in claim 1, wherein the step of receiving a request further comprises the steps of:
 a. receiving a query containing one or more search terms from the consumer;
 b. referencing a catalog to determine whether there is any entry containing the one or more search terms;
 c. returning to the consumer one or more content references corresponding to any entry containing the one or more search terms when such entry is present in the catalog; and
 d. receiving from the consumer a content reference selected by the consumer indicating a request for the information identified by the content reference.

28. The method as in claim 1, further comprising the step of receiving from a content owner an electronic contract representing an agreement between the content owner and a retailer.

29. The method as in claim 1, further comprising the step of receiving from a content owner one or more upstream business rules representing conditions for the distribution of selected item of information.

30. The method as in claim 1, further comprising the steps of:
 a. receiving a candidate offer from a retailer;
 b. certifying the candidate offer as a certified offer; and
 c. sending the certified offer to the retailer.

31. The method as in claim 30, further comprising the steps of:
 a. determining whether the candidate offer is consistent with an electronic contract; and
 b. designating the candidate offer as the certified offer when there are no inconsistencies.

32. The method as in claim 30, further comprising the steps of:
 a. determining whether the candidate offer is consistent with an upstream business rule; and
 b. designating the candidate offer as the certified offer when there are no inconsistencies.

33. The method as in claim 1, further comprising the steps of:
 a. determining whether there is an offer accompanying the request for the selected item of information received from the consumer; and
 b. supplying an offer to the consumer when there is no offer accompanying the request received from the consumer.

34. A system storing computer-readable instructions thereon for execution by a processor for distributing electronic information, said computer-readable instructions comprising:
 instructions receiving a request for a selected item of information from a consumer;
 instructions formulating one or more offers based on predefine upstream business rule parameters, wherein the one or more offers are associated with the selected item of information;
 instructions dynamically updating the predefine upstream business rules;
 instructions providing the one or more offers to the consumer based on the dynamically updated business rules;
 instructions receiving a selection of one of the offers from the consumer;
 instructions validating the one or more offers for the selected item of information requested by the consumer wherein the validating instructions references an electronic contract between one of a content owner and a distributor and a retailer, determines whether the offer is consistent with the electronic contract, and validates the offer when the offer when the offer is consistent with the electronic contract; and
 instructions delivering the requested information to the consumer and enabling the consumer to use the delivered information in accordance with the selected offer.

35. The system as in claim 34, further comprising a validating module for validating the one or more offers for the selected item of information requested by the consumer.

36. The system as in claim 34, wherein the validating instructions provide an alternative offer when the offer is determined to be invalid.

37. The system as in claim 34, wherein the validating instructions provide a default offer when the offer is determined to be invalid.

38. The system as in claim 34, wherein the validating instructions generates rights data which determine the one or more offers associated with the information requested.

39. The system as in claim 38, wherein the validating instructions generate the rights data prior to delivering the requested information and delivers the rights data together with the requested information.

40. The system as in claim 38, wherein the validating instructions provide the rights data to the consumer in a secure format.

41. The system as in claim 38, wherein the validating instructions dynamically updates the rights data.

42. The system as in claim 34, further comprising transaction processing instructions executing a financial transaction between the consumer and a retailer related to the use of the requested information.

43. The system as in claim 34, further comprising a player associated with the consumer wherein the player renders the selected item of information according to the consumer's request only when said request is consistent with said selected offer.

44. The system as in claim 34, wherein the validating instructions verify the current validity of the previously selected offer at a point in time subsequent to the selection of the offer.

45. The system as in claim 34, wherein the request receiving instructions receive a request from the consumer for additional material about the selected item of information; and wherein the delivery section provides additional material about said selected item of information to the consumer.

46. The system as in claim 45, wherein the delivery instructions provide a sample of said selected item of information.

47. The system as in claim 34, wherein the delivery instructions provide payment alternatives about said selected item of information to the consumer.

48. The system as in claim 34, further comprising registration instructions which operate to:
    a. determine whether the consumer has a player; and
    b. provide the consumer with the player when the consumer does not have the player; and
    c. activate the player for the consumer.

49. The system as in claim 34, wherein the delivery instructions deliver the requested information after enabling the consumer, at a time designated by the consumer.

50. The system as in claim 34, wherein the delivery instructions deliver audio information.

51. The system as in claim 34, wherein the delivery instructions deliver graphical information.

52. The system as in claim 34, wherein the delivery instructions deliver electronic information in a secure format.

53. The system as in claim 34, wherein the offer formulating instructions provide the one or more offers to the consumer in a secure format.

54. The system as in claim 34, further comprising monitoring instructions monitoring the use by the consumer of the delivered information.

55. The system as in claim 54, wherein the monitoring instructions detect the manner of use of the information previously delivered to the consumer; determine whether the use is within the scope of the selected offer; and prevent the use when the use is not within the scope of the selected offer.

56. The system as in claim 55, further comprising tracking instructions tracking the use by the consumer of the requested information when the use is within the scope of the selected offer.

57. The system as in claim 56, further comprising transaction processing instructions effecting a financial transaction according to the tracked use.

58. The system as in claim 57, wherein the transaction processing instructions effects the financial transaction according to the selected offer.

59. The system as in claim 34, wherein the offer formulating instructions provide an offer that allows the consumer to pay an amount for each instance of use of the information.

60. The system as in claim 34, wherein the offer formulating instructions provide an offer that allows the consumer to pay a fee for unlimited use of the information for a period of time.

61. The system as in claim 34, further comprising a query instructions which operate to:
    a. receive a query containing one or more search terms from the consumer;
    b. reference a catalog to determine whether there is any entry containing the one or more search terms;
    c. return to the consumer one or more content references corresponding to any entry containing the one or more search terms when such entry is present in the catalog; and
    d. receive from the consumer a content reference selected by the consumer indicating a request for the information identified by the content reference.

62. The system as in claim 34, wherein the offer formulating instructions utilize an electronic contact representing an agreement between a content owner and a retailer in formulating the one or more offers.

63. The system as in claim 34, wherein the offer formulating instructions utilize one or more business rules representing conditions for the distribution of selected item of information in formulating the one or more offers.

64. The system as in claim 34, further comprising certifying instructions certifying a candidate offer received from a retailer as a certified offer and sending the certified offer to the retailer.

65. The system as in claim 64, wherein the certifying instructions determines whether the candidate offer is consistent with an electronic contract and designate the candidate offer as the certified offer when there are no inconsistencies.

66. The system as in claim 64, wherein the certifying instructions determines whether the candidate offer is consistent with a business rule and designate the candidate offer as the certified offer when there are no inconsistencies.

67. The system as in claim 34, wherein the offer providing instructions operate to:
    a. determine whether there is an offer accompanying the request for the selected item of information received from the consumer; and
    b. supply an offer to the consumer when there is no offer accompanying the request received from the consumer.

* * * * *

UNITED STATES PATENT AND TRADEMARK OFFICE
CERTIFICATE OF CORRECTION

PATENT NO. : 7,209,892 B1
APPLICATION NO. : 09/471971
DATED : April 24, 2007
INVENTOR(S) : Albhy Galuten et al.

It is certified that error appears in the above-identified patent and that said Letters Patent is hereby corrected as shown below:

The sheet of drawing consisting of figure 1 should be deleted to appear as per attached figure 1.

Signed and Sealed this

First Day of September, 2009

David J. Kappos
*Director of the United States Patent and Trademark Office*